United States Patent
Sproch et al.

(10) Patent No.: US 11,960,346 B1
(45) Date of Patent: Apr. 16, 2024

(54) ENERGY PROVISIONING

(71) Applicant: Groq, Inc., Mountain View, CA (US)

(72) Inventors: James David Sproch, Monte Sereno, CA (US); Dinesh Maheshwari, Fremont, CA (US)

(73) Assignee: GROQ, INC., Mountain View, CA (US)

( * ) Notice: Subject to any disclaimer, the term of this patent is extended or adjusted under 35 U.S.C. 154(b) by 0 days.

(21) Appl. No.: 17/065,884

(22) Filed: Oct. 8, 2020

Related U.S. Application Data

(60) Provisional application No. 62/912,444, filed on Oct. 8, 2019.

(51) Int. Cl.
  *G06F 1/3296* (2019.01)
  *H02J 1/14* (2006.01)
  *H02M 3/158* (2006.01)

(52) U.S. Cl.
  CPC ............. *G06F 1/3296* (2013.01); *H02J 1/14* (2013.01); *H02M 3/1582* (2013.01); *H02J 2310/60* (2020.01)

(58) Field of Classification Search
  CPC ....... G06F 1/3296; H02J 1/14; H02J 2310/60; H02M 3/1582
  USPC .......................................................... 307/32
  See application file for complete search history.

(56) References Cited

U.S. PATENT DOCUMENTS

| | | | | |
|---|---|---|---|---|
| 7,672,107 B2* | 3/2010 | So | .......................... | H02H 9/025 |
| | | | | 361/93.9 |
| 10,317,922 B2* | 6/2019 | Park | ....................... | G05F 1/625 |
| 2009/0108677 A1* | 4/2009 | Walter | ................ | H02M 3/1588 |
| | | | | 307/80 |
| 2019/0173283 A1* | 6/2019 | Epel | .......................... | H02J 3/28 |
| 2020/0336003 A1* | 10/2020 | Narla | ...................... | H02J 3/381 |

\* cited by examiner

*Primary Examiner* — Richard Tan
(74) *Attorney, Agent, or Firm* — Amin, Turocy & Watson, LLP

(57) ABSTRACT

One or more embodiments of a regulator circuit for providing power to a load device having a first power demand profile over time. The regulator circuit comprises a regulator and an energy storage device coupled to the regulator and the load device. The regulator circuit is configured to scavenge provided energy that is available beyond the first power demand profile. Further, the regulator circuit is configured to store that energy in the energy storage device, and the energy storage device is configured to augment deliverable peak power to the load device when the load device requires more power than is provided by the regulator circuit.

15 Claims, 20 Drawing Sheets

ENERGY PROVISIONING

PRIORITY

The subject patent application claims priority to U.S. Provisional Patent Application No. 62/912,444, filed Oct. 8, 2019, and entitled "POWER SUPPLY REGULATOR CIRCUIT," the entirety of which application is hereby incorporated by reference herein.

TECHNICAL FIELD

This disclosure generally relates to embodiments for supplying power to electronic components, and more particularly to using deterministic approaches to improve the use of provisioned power.

BACKGROUND

To achieve efficient and high-performance operation, designers of electronic devices increasingly rely on complex approaches to provisioning power to support the operation of devices. One problem that can occur with provisioning power is handling peak demand loads. Conventional approaches tend to handle occasional, unpredictable irregularly high power demands either by consistently over-provisioning power to handle peak demands, slowing down the operation of devices to remove causes of peak demands, or increasing the unreliability of device operation by shutting down devices in response to peaks, e.g., by employing a fuse or circuit breaker to shut down.

Other conventional devices can use temporary stored power (e.g., provided by batteries or capacitors charged with input rail power) to provide backup power to a load device when mains power is unavailable. These approaches work similar to an uninterruptible power supply (UPS) that only replaces the missing source of power to a load device, e.g., these devices do not increase the magnitude of power available to the load device to handle peak demand loads.

Another problem that can occur with conventional approaches is related to unregulated input rail power or current. In some approaches to augmenting or increasing the peak power that can be provided to a load device there is no regulation of input power from a power source. In some circumstances, when excess power is drawn from a power source by a load device, power specifications for the input rail can be exceeded.

Thus, traditional approaches to these increasingly important problems of provisioning power tend to promote combinations of inefficiency, lower performance, and unreliable device operation.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," or "one or more embodiments" can be an indication that a particular feature, structure, or characteristic described in connection with the embodiment is included in at least one embodiment. Thus, the appearances of the phrase "in one embodiment," "in an embodiment," and "in one or more embodiments" in various places throughout this specification are not necessarily all referring to the same embodiment. Furthermore, the particular features, structures, or characteristics may be combined in any suitable manner in one or more embodiments.

As used herein, a "load device" broadly refers to an apparatus that demands an electrical load to perform work. Example components that can be used as a load device for some embodiments include application specific integrated circuits (ASIC). An example environment is the TENSOR STREAMING PROCESSOR (TSP) ARCHITECTURE from GROQ, INC. of Mountain View, California. Different processing tasks for aspects of machine learning can have patterns of operating states that are used by one or more embodiments described herein, e.g., for some tasks the TSP architecture uses a streaming processing model, with common software patterns that pass data in a stream, to and from different processing elements. In a process described by different embodiments herein, power requirements of recurring operations deterministically provide power to TSP ASICS, thus enabling many of the benefits described herein, e.g., increased power for some operations, use of different sources of available power, and efficient handling of peak power loads.

As used herein, an "operating state" of a load device broadly refers to power consumed by the load device during operations of the load device. For example, given a particular workload of operations, an ASIC can consume a particular amount of power and at an instant of time where the ASIC is performing operations at that particular workload, that can be described as the operating state of the ASIC.

Figure 2:
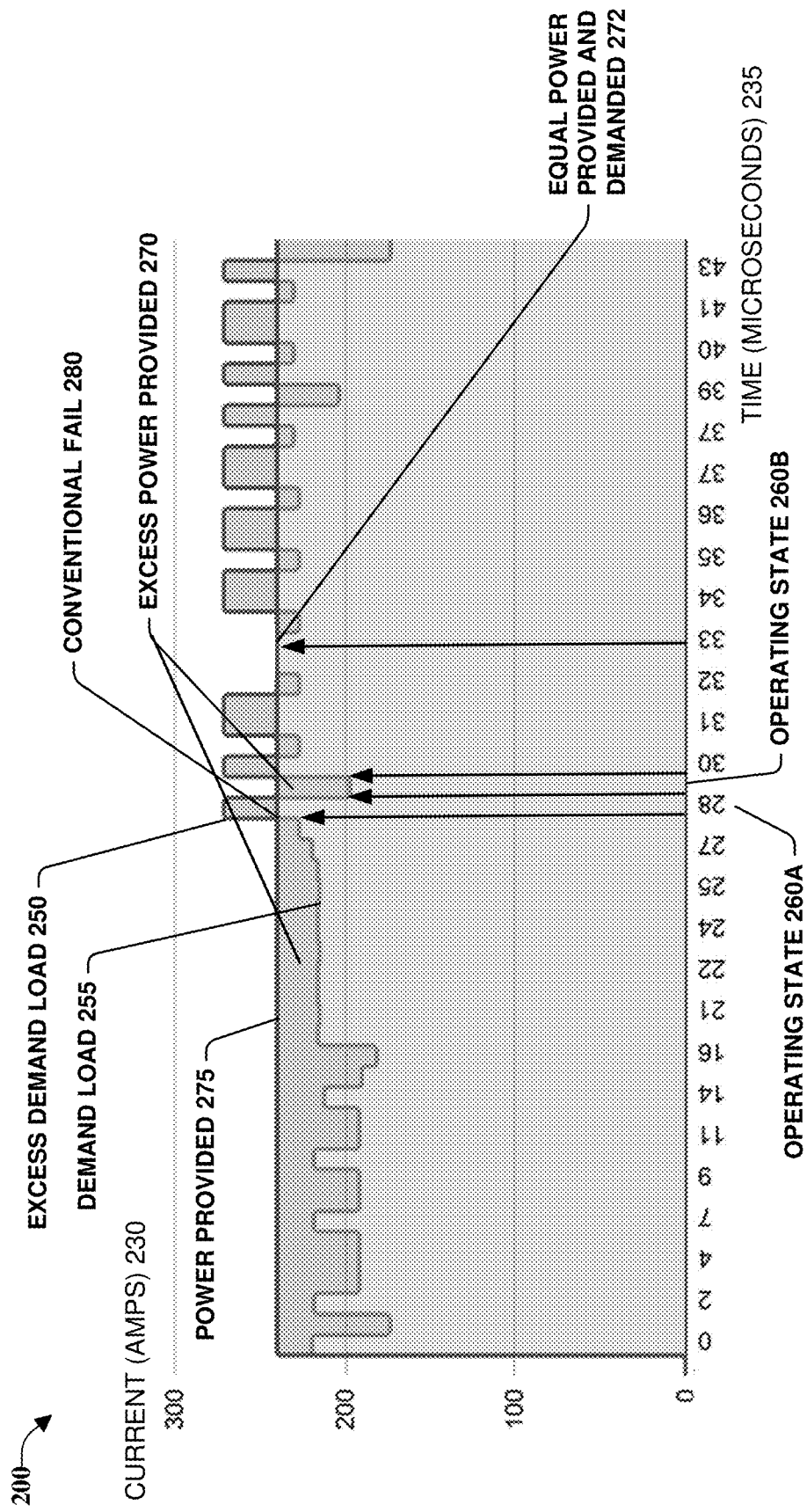
FIG. 2 depicts a non-limiting, example chart depicting power consumption of a device compared to provisioned power for a device for different operating states of the device over a period of time, in accordance with one or more embodiments described herein.

As used herein, a "series" of operating states of a load device refers to an example where the operation of the load device is performed according to a pattern of power usage, e.g., because operations or workload change according to a known schedule. It is important to note that, as described herein, a series of changes in operating state of a load device can be discrete or continuous. Load devices that can have a series of discrete operating states include, but are not limited to, a processor executing a sequence of instructions of a computer program. Load devices that have a series of continuous operating states include, but are not limited to, a load device that is utilized to process a regular set of analog data. FIG. 2 below provides an example of a series of discrete operating states, along with the power usage of the operating states and the power provisioned for the operating states.

As used herein a "demand power schedule" (also termed "power usage amount") refers to an operating demand load required for operation of a load device over a duration of time, e.g., for the series of operating states, discussed herein. As used herein, a "provisioned power schedule" refers to energy provisioned over time for a series of operating states of a load device. In one or more embodiments, combining the demand and provisioned power schedules yields the energy requirements of the series of operations, which can be used to confirm that the load device will not exceed operational limitations, as well as deterministically provide power to the load device while operating, e.g., after confirmation.

As used herein, an "energy storage device" broadly refers to a device that stores energy in the form of an electrical charge. Example components that can be used as energy storage devices for some embodiments include a capacitor, e.g., a component can store energy in the form of an electrical charge that produces a potential difference (static voltage) across conductive plates. Because different load devices can require different amounts of power under different conditions, as described with FIGS. 8 and 12 respectively below, one or more embodiments use capacitors with relatively high voltage range and capacitors with a smaller voltage range. High-voltage implementations, described with FIGS. 12-15 below, are implemented with capacitor components including, but not limited to, a high-voltage energy pooling capacitor, e.g., with operation over a 14V to 5V (deltaV=14V−5V=9V) voltage range. Low-voltage implementations, described with FIGS. 6-9 below, utilize capacitors that generally operate over a lower deltaV range than high-voltage implementations discussed with FIG. 12 below. As discussed further herein, energy stored on capacitors is proportional to change in voltage (i.e. deltaV) squared, and one or more embodiments can beneficially apply this principle to providing power to different types of load device. Other embodiments can use SuperCapacitors or UltraCapacitors which are capacitors with very large capacitance per volume in contrast to conventional capacitors. Other embodiments can use batteries in place of capacitors where the energy storage density or energy storage duration of a battery may in some circumstances be more advantageous than a capacitor.

In one or more embodiments described herein, an "initial state" of an energy storage device refers to an initial amount of energy that is stored on an energy storage device, before the commencement of the series of operating states described by the power schedule. In one or more embodiments, this initial state is factored into the assessment of whether operation of the load device will exceed operational limits of the load device and the power supplied.

As used herein, a "deterministic energy provisioning component" refers to a component that can provide energy for a load device based, for example, on deterministic waveform information (e.g., power schedules). In one or more embodiments, based on the availability of prospective information, deterministic energy provisioning (DEP) components can be utilized to store excess energy in the energy storage device during periods when excess power is provisioned, and subsequently provide this stored energy to satisfy a demand load in excess of provisioned energy.

It should be noted that, as used at some points of this disclosure, the term deterministic energy provisioning indicates provisioning energy based on information available in advance of an event, e.g., providing extra energy in time for a peak demand load. This provisioning based on information known about successive demand loads, contrasts to a circuit-breaker, where an action is triggered in response to the detection of the peak demand load event. This approach is distinguished over conventional approaches that merely provide stored energy in response to an increase in demand load responsively, not deterministically, as with embodiments described herein.

As utilized herein, input power rails (also termed herein input rails or power rails) is broadly interpreted to include any type of power source that can be used to provide power for one or more embodiments described herein. Input power rails discussed herein also provide power from multiple, independent sources that are the same voltage, slightly different voltages, or significantly different voltages. For example, in accordance with the industry standard PCI Express (Peripheral Component Interconnect Express) serial computer expansion bus (PCIe bus), components installed with a PCIe circuit board can be powered by input power rails at 3.3V and 12V. As discussed below, a benefit of some embodiments discussed herein is that power from multiple input power rails can be combined and provided to the load device for use.

As used herein, a "boost power regulator" (also termed "boost regulator"), in some circumstances by some embodiments regulates DC power provided by an input power rail, e.g., so an output voltage that is higher than the input rail voltage can be provided to a load device connected to the output of the boost power regulator. Example components that can be used as a boost power regulator with certain embodiments include, but are not limited to power DC/DC controller TLD5098 from INFINEON TECHNOLOGIES AG.

As used herein, a "buck power regulator" (also termed "buck regulator") can be used, in some circumstances by some embodiments to regulate DC power provided by an input power rail, e.g., so an output voltage that is lower than the input rail voltage can be provided to a load device connected to the output of the buck power regulator. Example components that can be used as a buck power regulator with certain embodiments include, but are not limited to power DC/DC controller IR35223 from INFINEON TECHNOLOGIES AG.

As used herein, a "buck-boost power regulator" (also termed "buck-boost regulator") is a power regulator that can drop down, or boost up the voltage of power from an input power rail, e.g., so that the output voltage can be either lower or higher than the input power rail voltage, depending on the configuration and operating conditions of the regulator and load device. In some implementations, buck-boost power regulators can employ metal-oxide-semiconductor field-effect transistor (MOSFET) switches to transition from a step-down mode (e.g., buck) and then to a step-up mode (e.g., boost) to produce an output voltage that is lower or higher than the input voltage, depending on the configuration and operating conditions of the regulator and load device. Example components that can be used as a buck-boost power regulator include, but are not limited to, a single inductor high power Buck-Boost Controller TLD5541 from INFINEON TECHNOLOGIES AG.

As used herein, a DEP power regulator (also termed a DEP load regulator herein) is a buck power regulator, a boost power regulator, or a buck-boost power regulator circuit that can be used as part of a DEP system to deliver power to a load device, sometimes in excess of the power provisioned for the input power rail by using stored energy, while never exceeding the input rail power or current limits.

As used herein a "simulation component" is a component that can use a power schedule and an initial state of an energy storage device, to simulate operation of the series of operating states described by the power schedule. For example, a simulation component can determine whether excess power provided for a load device, combined with energy stored on the energy storage device is sufficient to handle demand loads for an operating state of a load device that exceed the power provisioned for the operating state.

The above discussion of different terms used herein is non-limiting, and additional details or different features can be provided with one or more embodiments discussed below.

Figure 1:
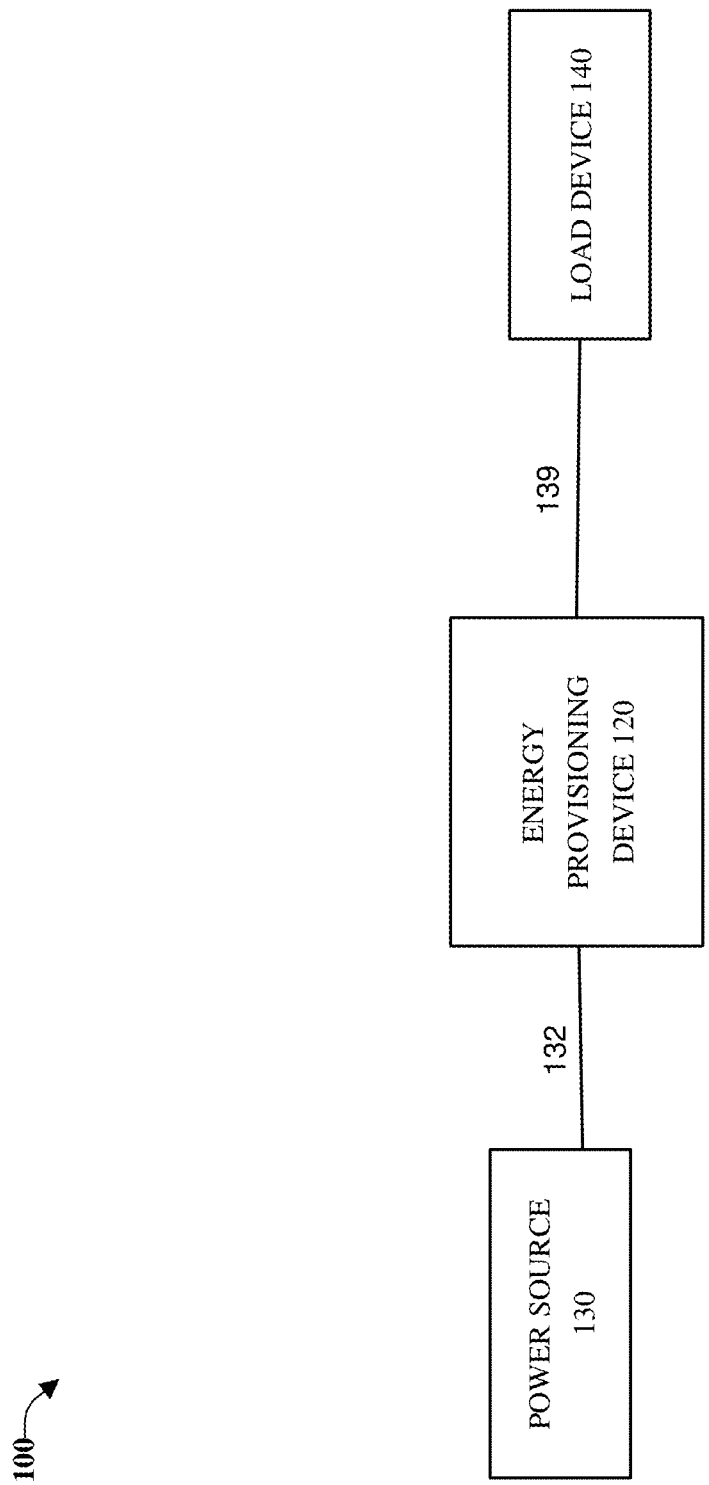
FIG. 1 depicts a block diagram of a non-limiting, example system for provisioning power for a device for operation of the load device through a series of operating states, in accordance with one or more embodiments described herein.

FIG. 1 depicts a block diagram of a non-limiting, example system 100 for provisioning power for a device for operation of the load device through a series of operating states, in accordance with one or more embodiments described herein. For purposes of brevity, description of like elements and/or processes employed in other embodiments described below, is omitted.

In accordance with one or more embodiments, system 100 includes power source 130 providing power 132 to energy provisioning device 120 for providing power 139 to load device 140. In system 100, energy provisioning device 120 provides a variety of functions useful for operation of load device 140, including but not limited to, power regulation. In a conventional implementation (e.g., the output of which is depicted in FIG. 2 below), an amount of power is provisioned for load device 140 without reference to a demand load required by load device 140 for a particular operating state, with excess power being unused. As discussed further herein, this approach, and variations of this approach, is limiting in several ways that are addressed by one or more embodiments described herein.

FIG. 2 depicts a non-limiting, example chart 200 depicting power consumption of a device compared to provisioned power for a device for different operating states of the device over a period of time, in accordance with one or more embodiments described herein. For purposes of brevity, description of like elements and/or processes employed in other embodiments described below, is omitted.

Chart 200 illustrates several aspects of the conventional approach described above with FIG. 1, as well as different approaches that are utilized by one or more embodiments. Chart 200 includes current (amps) 230 on a Y-axis, and time (microseconds) 235 on an X-axis. On chart 200, the demand load for the operation of load device 140 over a duration of time is depicted for a series of operating states.

As noted above, as depicted in FIG. 2, and as sometimes used herein, operating states are depicted as having a discrete beginning and ending point. For example, operating state 260A begins at the 28th microsecond and ends at the end of the beginning of the 29th microsecond, with the beginning of operating state 260B. An example of this type of execution is the execution of instructions by a processor executing a computer program. One or more embodiments provision power for demand loads during these types of discrete operating states (e.g., as depicted in FIG. 2) as well as operating states that have continuous transitions (e.g., when a load device is utilized to process analog data).

Returning to a discussion of a conventional implementation of energy provisioning device 120 discussed with FIG. 1, FIG. 2 illustrates five conditions that can be identified by one or more embodiments based on the power provided and the operating states of load device 140. For example, chart 200 depicts a first condition identified by one or more embodiments, where, for an operating state of load device 120, power provided 275 exceeds demand load 255 of load device 140, e.g., from 0 to 28 microsecond. In this range, as well as other sub-ranges of chart 200 where power provided 275 exceeds demand load 255, power is provided for an operating state that is in excess of the power required for the operating state, with this excess power being unused in conventional implementations. As described below, in some circumstances, one or more embodiments can improve the utilization of this otherwise unused provided power.

A second condition identified by one or more embodiments is illustrated by operating state 260A at the 28th microsecond. At this point an excess demand load 250 is caused by a demand load of operating state 260A, with 'excess' referring to an excess amount of power demanded beyond power provided 275 by power source 130. In some conventional implementations, at this second condition, conventional fail 280 occurs with respect to power provisioned for operation of load device 140 during the depicted duration of time, e.g., peak power consumption of load device 140 during operating state 260A exceeds provisioned power. In some conventional implementations, an event such as conventional fail 280 may cause a fuse to blow, a circuit breaker to trip, or a power supply to shut down, where these responses are intended to protect the system from an overload condition where the demand load exceeds the input power limits.

A third condition that can be identified by one or more embodiments is illustrated by FIG. 2 at 33 microseconds. As depicted at this point 272, power provided 275 is equal to demand load 255. In one or more embodiments, because there is neither excess power provided 270 nor an excess demand load 250, energy is neither stored nor provided for the operating state.

A fourth condition can be identified by one or more embodiments, where the amount of demand load required for a series of operating states is predicted to exceed the amount of available energy from the power source for performing the series of operating states, also termed a "load device job" herein. In this example, this fourth condition can be identified before commencement of the job by load device 140. One or more embodiments identify an amount of power by the load device job that exceeds the amount of energy stored on the energy storage device at a particular time. One result of identifying this fourth condition causes the commencement of the load device job by the load device to be postponed until sufficient additional energy is stored on the DEP energy storage device. Alternatively, one or more embodiments can identify a fifth condition, where there is not sufficient room in the DEP energy storage device to store the required additional energy. In one or more embodiments, identifying this fifth condition can cause the load device job to not be commenced at all.

Expanding on actions taken by one or more embodiments based on available information, in an exemplary embodiment, in advance of the operation of load device 140 (e.g., before time zero) a demand power schedule for an operating demand load 255 of load device 140 over the duration of time, and a provisioned power schedule of available power provided 275 by power source 130 over the duration of time is utilized to predict in advance of commencing operation of the load device 140, energy requirements for the operation of load device 140 over a duration of time.

Example approaches to generating the power schedules noted above are discussed with FIG. 3 below, and example approaches to predicting energy requirements are discussed with FIG. 4 below. As described herein, these energy requirements can be used by one or more embodiments to facilitate different beneficial results described beginning with the basic operation of a DEP load regulator and an energy storage device. In addition, as described with FIGS. 4-5 below, a device operation facilitator can utilize the predicted energy requirements to predict whether any failure conditions will occur in the operation of the DEP load regulator with power source 130 and load device 140.

Figure 3:
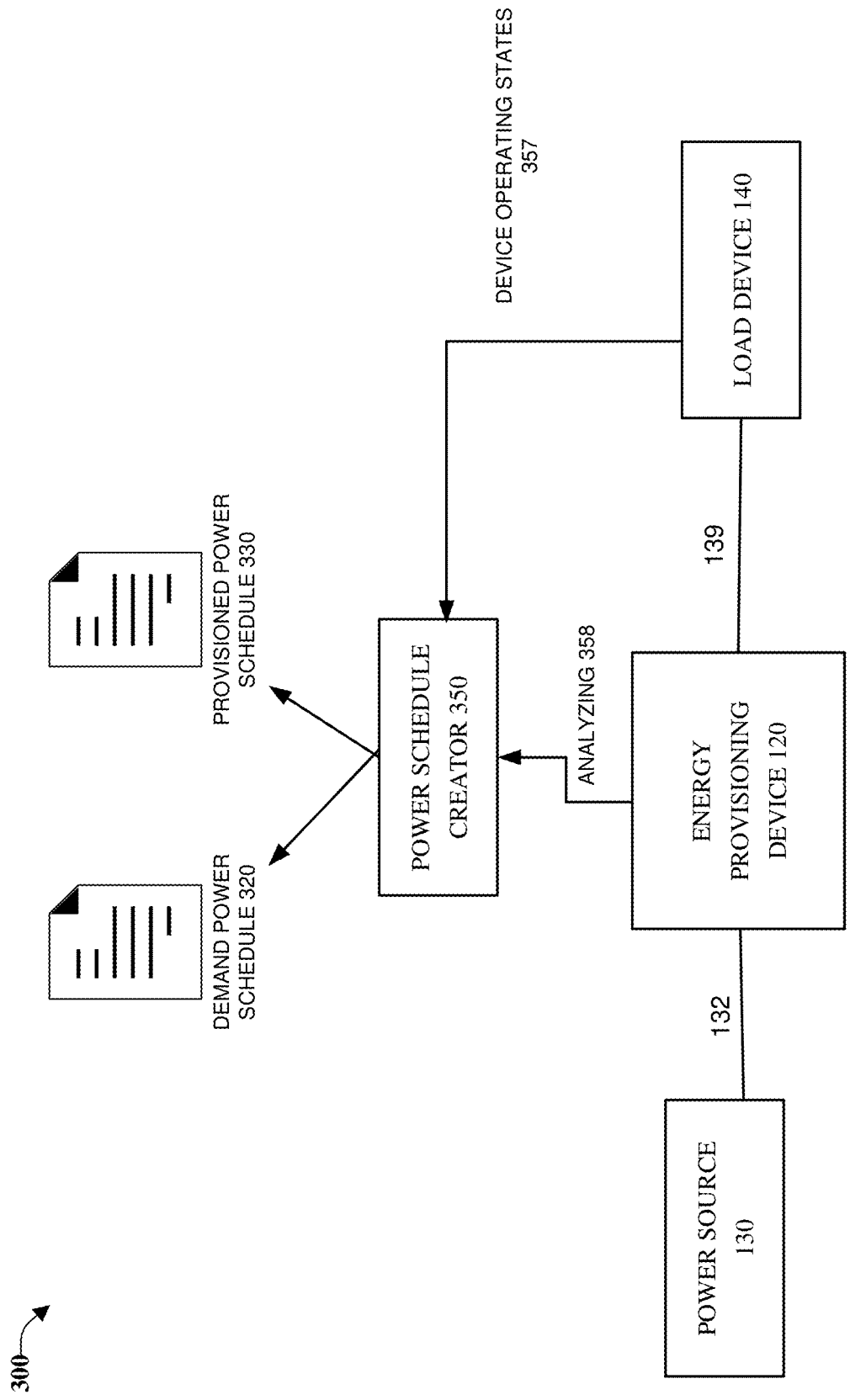
FIG. 3 depicts a block diagram of a non-limiting, example system for generating power schedules for a device over a series of operating states, in accordance with one or more embodiments described herein.

FIG. 3 depicts a block diagram of a non-limiting, example system 300 for generating power schedules for a device over a series of operating states, in accordance with one or more embodiments described herein. For purposes of brevity, description of like elements and/or processes employed in other embodiments described below, is omitted.

System 300 includes the components of system 100 described above along with power schedule creator 350, demand power schedule 320 and provisioned power schedule 330. In one approach, power schedule creator 350 can analyze 358 the operation of load device 140 during the series of device operating states 357 over a duration, e.g., power provided 275 and demand load 255 depicted from 0 to 27 microseconds in FIG. 2 discussed above.

Alternative approaches can be used for operating states of operation of load device 140 where excess demand load 250 exists given power provided 275, e.g., this occurring intermittently, starting at 28 microseconds on FIG. 2. Example alternative approaches include, but are not limited to, estimating power schedule information based on operation, simulation, modeling, or analysis. Further, as suggested by the above descriptions, can be used to generate demand power schedule 320 and provisioned power schedule 330.

Figure 4:
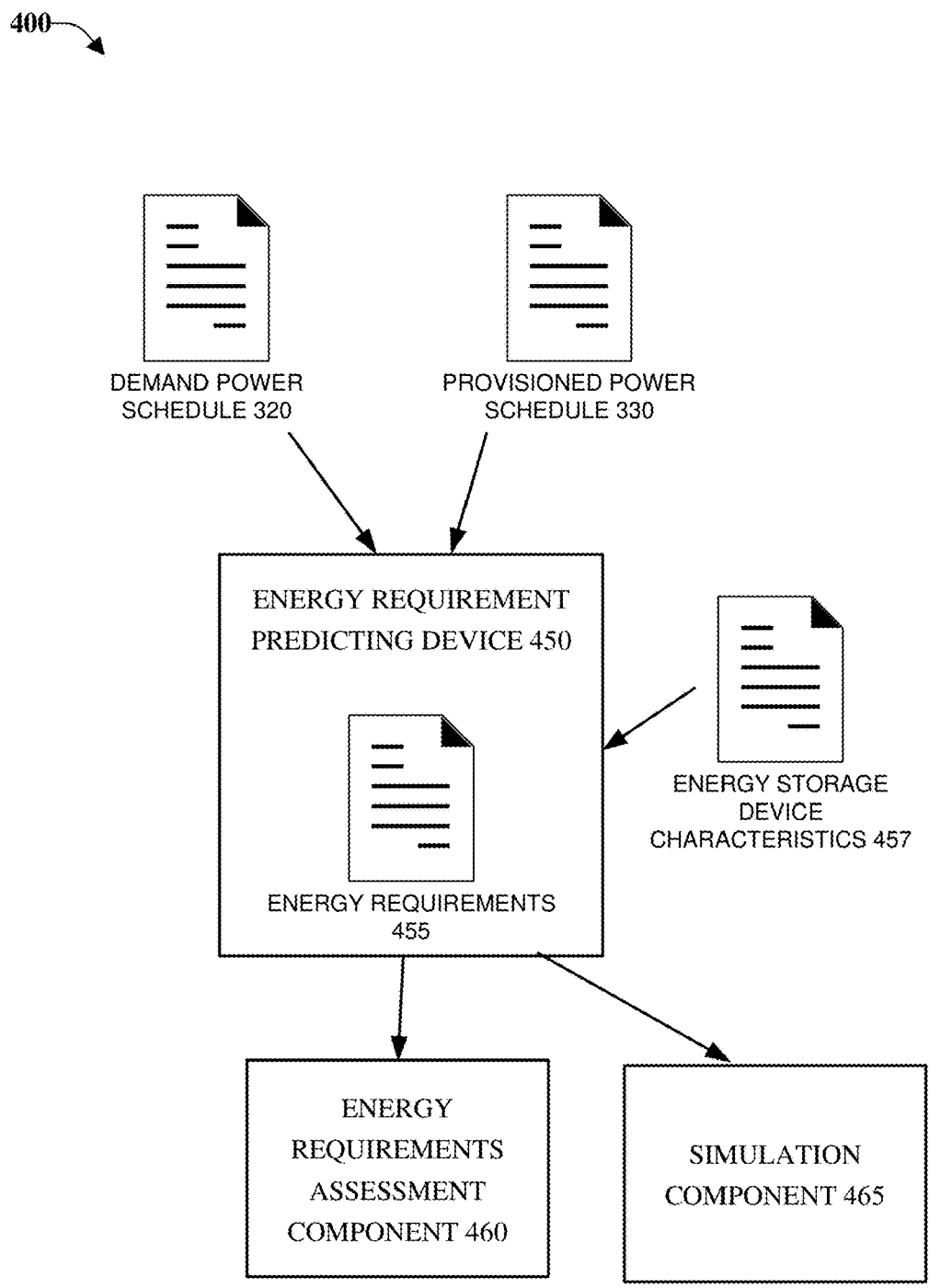
FIG. 4 depicts a block diagram of a non-limiting, example system for predicting energy requirements of a device based on power schedules determined by operating the device for different operating states of the device over time, in accordance with one or more embodiments described herein.

FIG. 4 depicts a block diagram of a non-limiting, example system 400 for predicting energy requirements of a device based on power schedules determined by operating the device for different operating states of the device over time, in accordance with one or more embodiments described herein. For purposes of brevity, description of like elements and/or processes employed in other embodiments described below, is omitted.

As depicted, system 400 includes energy requirement predicting device 450, demand power schedule 320, provisioned power schedule 330, energy storage device characteristics 457, simulation component 465, and energy requirements assessment component 460. Embodiments can utilize a generated demand power schedule 320 and a provisioned power schedule 330 to predict energy requirements 455 for a load device, e.g., for load device 140 depicted in FIG. 1.

System 400 can also include an energy requirement predicting device 450 with a memory that stores executable instructions that, when executed by a processor, facilitate performance of operations that predict energy requirements 455 based on information that includes, but is not limited to, demand power schedule 320, provisioned power schedule 330, and energy storage device characteristics 457. With respect to the memory and processor discussed above, FIG. 20 discusses example computing environments where different embodiments can be implemented.

The operations include receiving demand power schedule 320 for an operating demand load 255 required for load device 140 over a duration of time for a series of operating states. Additional information received includes provisioned power schedule 330 of power provisioned by a power source over the duration of time for the series of operating states, and a characteristic of the energy storage device at the beginning of the duration of time.

Operations can further include predicting in advance of commencing operation of the load device 140, energy requirements 455 of the device for completion of the series of operating states over the duration of time. It should be noted that the above energy requirements 455 can be interpreted based on different energy provisioning procedures, e.g., FIG. 2 above is an example of energy requirements over time, with periods of sustained over-provisioning of power (e.g., 0 to 28 and multiple conventional fail 280 points, where operation of load device 140 can be interrupted, e.g., by a circuit breaker device.

In one or more embodiments, energy requirements 455 is used by different embodiments associated with the operation of load device 140. For example, as discussed below with FIGS. 6-13, energy requirements 455 is used to deterministically provide power for load device 140 over the duration of time for the series of operating states. In alternative embodiments however, energy requirements 455 are used to determine, given a load device, a power source, and the analyzed series of operating states, whether the series of operating states is successfully performed without an excess demand load 250 causing a conventional fail 280 condition. In one or more embodiments, simulation component 465 is used to simulate the performance of the series of operating states to yield these predictions.

In a variation of this example, energy requirements 455 is used to schedule the execution of the series of operating states to a time when stored energy is used to handle excess demand loads, e.g., delaying commencement of the execution of the series of operating states in order to successfully perform the series of operating states without conventional fail 280 condition. This condition is discussed above with FIG. 2, e.g., the fourth condition is identified if delaying performance of the operating states is predicted to result in success.

In yet another variation of this example, energy requirements 455 can be used to determine that the execution of the series of operating states would result in excess demand loads, the cumulative consequence of which would exceed the total capacity of the DEP system to store the required amount of energy, so the execution of the series of operating states would not be commenced e.g., not commencing the series of operating states to avoid conventional fail 280 conditions. This is discussed with FIG. 2 above as the fifth condition, with this condition being identified if stored energy is predicted not to be sufficient to complete the series of operating states.

In yet another example, one or more embodiments can utilize energy requirements assessment component 460 to analyze energy requirements 455 so as to collect different metrics associated with device performance and efficiency, e.g., average operations completed by load device per second per provisioned watt of power.

Additional factors can improve the accuracy of the generated energy requirements. For example, as depicted in FIG. 4, energy storage device characteristics 457 can also be provided. This additional information can be used, for example, to simulate how different deterministic energy providing solutions discussed herein can be configured to improve the provision of power for load device 140. In one or more embodiments, energy storage device characteristics 450 refers to one or more characteristics of an energy storage device used to store excess power provided by power source 130, and example characteristics include, but are not limited to, an initial state of the energy storage device at time zero depicted in FIG. 2, e.g., before the commencement of the operation of load device 140. Different approaches to simulating the results of one or more embodiments are discussed below with the structure and operation of different types of DEP load regulators, e.g., in FIGS. 5-10 and 12-17.

In an example implementation of energy requirements 455 and energy requirements assessment component 460, load device 140 is operating in an environment where large amounts of power are consumed to perform mostly repetitive operations, with high-performance and up-time being important, e.g., data center applications. For this example, one or more embodiments of power schedule creator 350 is used to analyze 358 or estimate information for a demand power schedule 320, and provisioned power schedule 330 could be created to match the demand power schedule, e.g., with the lowest amount of power being provided that can maintain performance and reduce the likelihood of service interruptions.

As will become apparent based on the descriptions herein, by utilizing the excess power capturing, deterministic approaches described herein, demand power schedules that can increase performance can, in some circumstances, be combined with a provisioned power schedule that can enable the lowest realizable energy configuration for the performance required. In another embodiment, by utilizing the excess power capturing, deterministic approaches described herein, demand power schedules that can increase performance can, in some circumstances, be combined with a provisioned power schedule that can enable the shortest latency or highest performance realizable configuration for the energy level that is required. In addition, based on the accuracy with which some approaches described herein can predict the demand load 255 caused by respective operating states, the energy requirements 455 that would deterministically control the provisioning of power could be tested by energy requirements assessment component 460 before the system is deployed and depended upon.

It should be noted, with respect to the extensive discussion below of different embodiments of DEP systems having different characteristics, that these descriptions also describe different models that are used to interpret energy requirements described above. It should also be noted that, as described below, energy requirements 455 is used to control some of the DEP approaches of embodiments, e.g., by providing advance information about the load demands of different operating states of load device 140.

Figure 5:
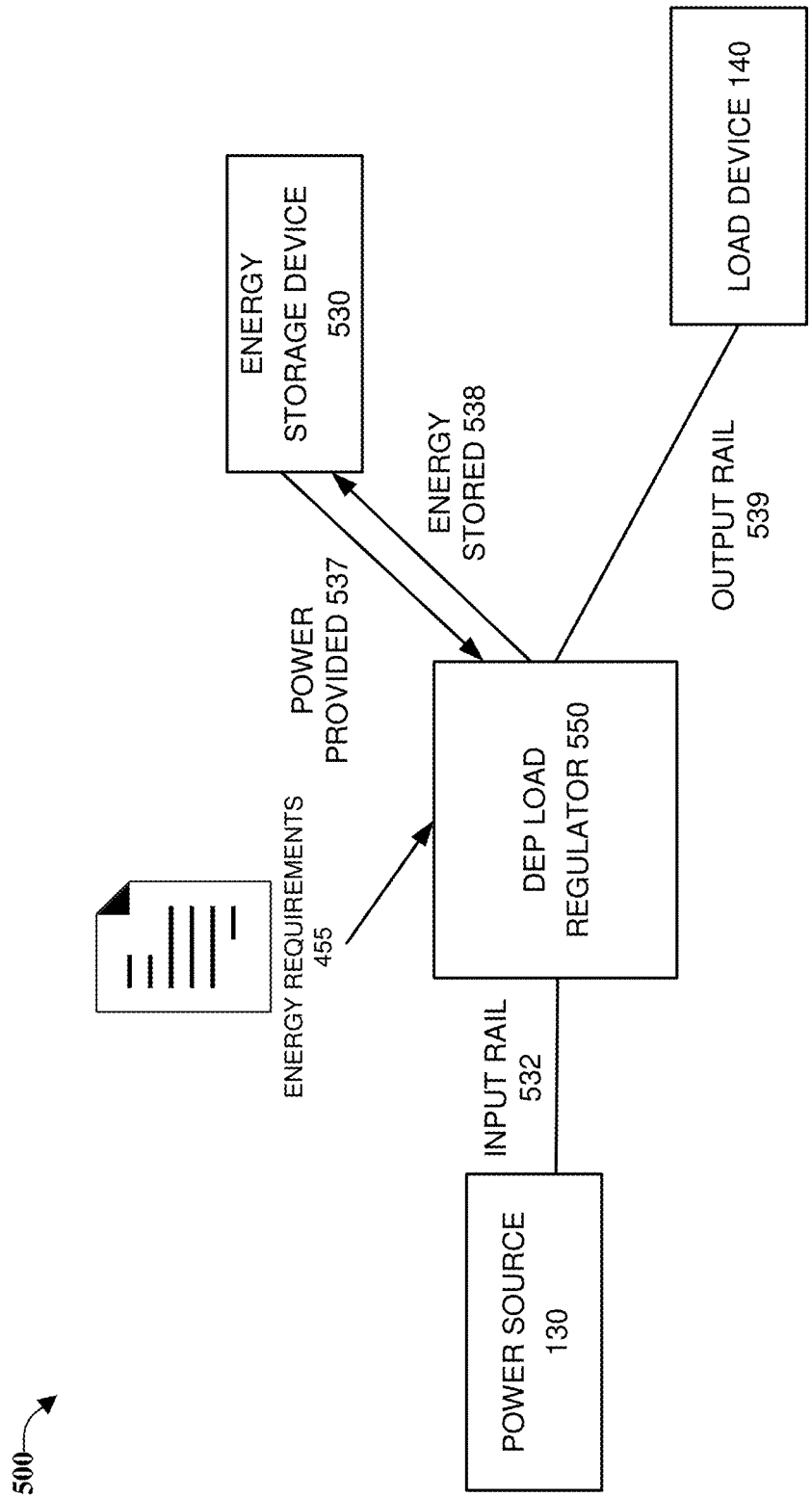
FIG. 5 depicts a block diagram of a non-limiting, example system for deterministic energy provisioning for different operating states of the device over time, in accordance with one or more embodiments described herein.

FIG. 5 depicts a block diagram of a non-limiting, example system 500 for deterministic energy provisioning for different operating states of the device over time, in accordance with one or more embodiments described herein. For purposes of brevity, description of like elements and/or processes employed in other embodiments described below, is omitted.

As depicted, example system 500 includes power source 130, input power rail 532, DEP load regulator 550, energy storage device 530 with power provided 537 and energy stored 538, energy requirements 455, output power rail 539, and load device 140, in accordance with one or more embodiments. Before additional features are described with FIGS. 6-10 and 12-17 below, FIG. 5 depicts example characteristic features of different embodiments of DEP systems described herein.

Broadly speaking about embodiments described herein, in some circumstances DEP load regulator 550 can draw a controlled amount of power from the input power rail 532, and store energy on energy storage device 530 when an operating state requires less power than the controlled amount of power that input power rail 532 provides. In other circumstances, one or more embodiments of DEP load regulator 550 can use some of the energy stored on energy storage device 530, during periods when the load required by an operating state requires more power than the controlled amount of power provided by input power rail 532.

In one or more embodiments, energy flow is unidirectional in moving only from input power rail 532 to energy storage device 530, and never from energy storage device 530 to the input power rail 532. In one or more embodiments, because, in this example, load device 140 can have a deterministic schedule of power use over time (e.g. energy requirements 455 for a series of operating states), embodiments can, during operation of load device 140, provide a controlled amount of power to load device 140 from input power rail 532, storing excess energy at known points (e.g., for excess power provided 270, energy stored 538 on energy storage device 530) and utilizing stored energy at other known points, e.g., excess demand load 250 handled by power provided 537 from energy storage device 530.

It should be noted that the input power limit can be controlled to a constant value in some embodiments, or it can be controlled to different values at different times in other embodiments, e.g. when the input power rail is specified to allow Excursion Design Power (EDP). With EDP, the input power limit can be specified as a higher power level, (e.g. 10% or 20% higher than the nominal level) for a certain duration of time before being returned back down to the nominal level. In one or more embodiments, EDP periods can be repeated, e.g. in a periodic pattern or in a nonperiodic repetition). Stated differently, the input power limit that is used in provisioned power schedule 330 may be bounded by a fixed value, or the bounding limit value may be different at different times such as during permitted EDP intervals. It should be noted that, during this period, power can be provisioned based on either a constant value, or a schedule of different values. The changes in input power limits can be incorporated into provisioned power schedule 330, e.g., used to set the input power or current limits on the regulators.

In additional embodiments, the deterministic schedule of power that is utilized during operation of load device 140 can also be used before operation of load device 140 to determine whether operating limits of load device 140, input power rail 532, and energy storage device 530 will be exceeded over the period of time, e.g., for the series of operating states. In this example, load device 140 is operated (or not) for the series of operating states based on the power schedule and this determination, e.g., commencing the operation of load device 140 for the series of operating states is based on determining that the operating limits noted above will not be exceeded.

Figure 6:
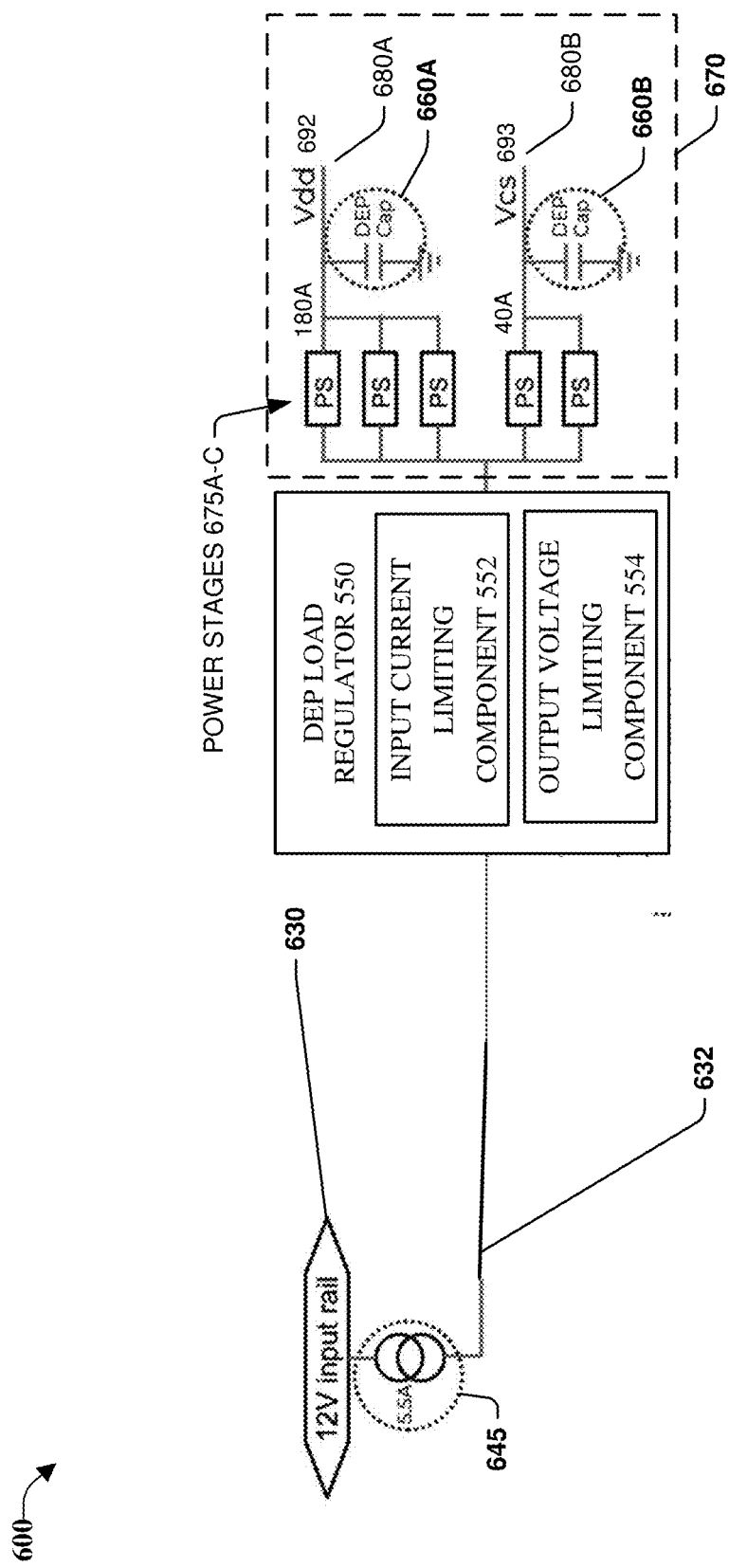
FIG. 6 depicts a detailed block diagram of a non-limiting, example embodiment of a system for deterministic energy provisioning for different operating states of a device over a period of time, in accordance with one or more embodiments described herein.

In this example, power source 130 of FIG. 1 is provided by input power rail 532. It should also be noted that, while FIGS. 5 and 6 utilize a single power rail (e.g., a 12V rail, as depicted in FIG. 6) one or more embodiments can pool (e.g., combine) power provisioned by multiple rails to capture additional, often unutilized sources of power for provisioning for load device 140.

Turning to the operation of some embodiments of DEP load regulator 550, in an example where power to load device 140 is being provided, energy requirements 455 is utilized to perform actions, e.g., in response to the five conditions discussed with FIG. 2 above, and further described with FIG. 3. These five conditions correspond to the relationship between power demanded and power provisioned. e.g., the amount of input power 532 provided by input power rail 520 to perform the operating states of load device 140. In one or more embodiments, the G ut of energy storage device 530 can be selected to enable the storage of energy to support successful completion of the operating states. As described further below, DEP embodiments discussed herein will be used to predict and coordinate power, set usage limits using compiler info, and schedule layer/job power usage For example, in one or more embodiments, energy requirement predicting device 450 can predict, for a particular operating state of the series of operating states, that the amount of power provided 275 from power source 130 for the operating state (e.g., operating state 260B) will exceed the amount of demand load 255 of the operating state by an amount of available excess power 270. In one or more embodiments, this excess power 270 is stored 538 as energy on energy storage device 530, e.g., also termed herein energy sequestered on energy storage device 530. As described further below, for different circumstances, use of energy storage device 530 is controlled by DEP load regulator 550 and employs different types of energy storage devices.

In accordance with another example, energy requirement predicting device 450 can predict, for a particular operating state of the series of operating states, that the amount of input power provided 275 from power source 130 for the operating state will be equal to the amount of demand load required for the operating state (not shown in FIG. 2). Based on this prediction, no storage or retrieval actions are performed by one or more embodiments.

In another example, energy requirement predicting device 450 can predict, for a particular operating state of the series of operating states, that the amount of demand load 255 for the operating state will exceed the amount of power provided 275 from power source 130 for the operating state, e.g., excess demand load 250 during operating state 260A of FIG. 2.

As noted above, in some conventional approaches, excess demand load 250 can cause problems with the operation of load device 140. One having skill in the relevant art(s), given the description herein, will appreciate that, in some conventional implementations, this excess demand load 250 is addressed by an overall reduction in the amount of voltage provided to load device 140 or lowering the operating clock frequency to reduce the power required by load device 140. In some situations, this approach can reduce peak demand loads 255 so as to avoid the excess demand load 250 condition. These approaches however, can reduce the performance of load device 140 in some circumstances, e.g., providing less voltage to a device 140 that can utilize higher voltages to increase a speed with which operations can be performed, such as an integrated circuit.

In contrast to the conventional approaches, one or more embodiments can utilize energy stored based on previous instances of excess power provided 270 to supplement power provided 275 from power source 130, thereby increasing the power available to load device 140 without having to increase power provided 275 from power source 130. In addition, as discussed further with FIGS. 12-14 below, one or more embodiments can provide higher output voltages for load device 140, e.g., increasing voltage provided over conventional approaches, thereby enabling faster performance or shorter latency to the completion of a series of operations.

Returning to the generating of energy requirements 455 for operation or simulation of system 500, it important to note that, in some operations of DEP load regulator 550, energy storage device 530 has no energy stored at time zero, and, as described above, stored energy builds up based on excess power provided 270 during some of the series of operating states, e.g., from time zero to the beginning of the 28th microsecond, energy requirements 455 includes predictions that excess power provided 270 will be stored on energy storage device 530.

In other circumstances however, energy storage device 530 has existing energy stored thereon before the operation of load device 140. As noted above with FIG. 4, energy requirements 455 include energy storage device characteristics 450 and, to account for existing stored power, an energy storage device characteristic 450 that can be provided is the initial state of energy storage device 530, e.g., how much energy is stored on the energy storage device 530 at the time the series of operating states is commenced. In some implementations, taking the initial energy stored on energy storage device 530 into account can improve predictions about the status of this device, during the series of operating states. For example, considering FIG. 2, taking initial stored energy into account can determine whether, over the time ranging from 0 to 43 microseconds, whether excess power provided 270 will be less than, equal to or greater than excess demand load 250.

As suggested by discussion above, one approach that avoids a depleted state of energy storage device 530 is to determine (e.g., by analyzing energy requirements 455) an overall amount of excess demand load 250, and delaying the start time of the next job (i.e. the next set of operations) such that there is enough additional time during which provisioned power in excess of the power demanded by the load device can be used to charge the energy storage capacitor until the state of energy storage device 530 becomes equal to or greater than this deficiency.

FIG. 6 depicts a detailed block diagram of a non-limiting, example embodiment of system 600 for deterministic energy provisioning for different operating states of a device over a period of time, in accordance with one or more embodiments described herein. For purposes of brevity, description of like elements and/or processes employed in other embodiments described below, is omitted.

As depicted, system 600 includes 12V input power rail 630, DEP load regulator 550, power stages 675, output rails 680A and 680B and DEP capacitors 660A-B. Generally speaking, the embodiment depicted on FIG. 6 is termed a low-voltage implementation in comparison to a so-called high-voltage implementation described with FIG. 12 below. It should be considered that this 'low-voltage' descriptor is non-limiting (e.g., different inputs, storage, and voltages can be handled by both implementations).

For example, the embodiment of FIG. 6 controls the input power to a bounded level, e.g. 66 Watts (12V*5.5 A), the provisioned power of the 12V input power rail, but, in this embodiment, no component is included to charge a high-voltage energy storage capacitor, e.g., as is done with the high-voltage implementation described with FIG. 12 below.

With respect to storage of power in excess of the power provisioned by 12V input power rail 630, as depicted in FIG. 6, this example utilizes energy storage capacitors 660A-B on the output of DEP load regulator 550. In some implementations of this low-voltage example, DEP load regulator 550 is the only load regulating component that affects power provisioned by 12V input power rail 630 to implement one or more features described herein. This contrasts with other embodiments discussed herein, e.g., the 'high-voltage' example embodiment discussed with FIG. 12 below.

In one or more embodiments, the combination of load currents supplied by any one input power rail can be managed by the input current limiting features of a DEP embodiment such that the combination of all of the load currents does not exceed the maximum power specification for that particular input power rail. For example, DEP load regulator 550 includes input current limiting component 552 configured to maintain a load on 12V input power rail that maintains a set wattage, with the power or current at a selected value, e.g., 66 Watts of power (e.g., 12V*5.5 A), as described above and indicated on the schematic as device 645, or any other power or current limit value over time that can be implemented using features of one or more embodiments described herein.

In a conventional system, in one approach used to accomplish this, a circuit-breaker is used, e.g., when the current drawn at by Vdd 692 pin at output rail 680A exceeds a regulated value, the system shuts down. In contrast, DEP load regulator 550 includes output voltage limiting component 554, configured to maintain selected levels of output voltage provided by output rails 680A-B to load device 140 (not shown). As described further with FIG. 11 below, one approach that can be used by embodiments to limit output voltage includes the use of power stages 675A-C to adjust output voltage, e.g., as can be required by load device 140. As discussed further with FIGS. 10-11 below, DEP load regulator 550 can regulate voltage output by adjusting the output of power stages 675A-C. By way of example, ten (10) Vdd 692 pins of load device 140 and four (4) for Vcs 693 pins of load device 140 (three and two stages being respectively depicted in FIG. 6). Components that can be used by one or more embodiments to implement one or more of power stages 675 include, but are not limited to, Integrated Power Stage TDA21472 from INFINEON TECHNOLOGIES AG.

One or more embodiments guarantee that 12V input power rail 630 is actively regulated at a selected current as a characteristic of the system 600, e.g., 5.5 A in FIG. 6. In an example, 12V input power rail 630 provides up to 66 Watts of power (e.g., 12V*5.5 A), and one or more embodiments continually draws this wattage, e.g., utilizing a constant 12V source and maintaining a constant current draw of 5.5 A of current corresponding to 66 Watts of power, e.g., a maximum amount of power available from 12V input power rail 630. In contrast, in a conventional approach, 66 Watts could be consistently provisioned by 12V input power rail 630, but not all of the power would be used for an operating state of load device 140. e.g., as depicted by excess power provided 270 in FIG. 2.

To facilitate this constant voltage with regulated current, in one or more embodiments, when a power schedule indicates that the demand wattage for an operating state will require a draw of current that exceeds 5.5 A, stored energy can be utilized (e.g., stored on DEP capacitors 660A-B) to provide the excess demand load 250. DEP capacitor 660A is positioned on node 680A at the output of the power stages 675A-C, and DEP capacitor 660B is positioned on node 680B at the output of the power stages 675D-E, to facilitate a faster response and recovery time to respond to changes in power required by the load device. Because DEP capacitors 660A and 660B are located on the lower voltage nodes 680A and 680B respectively, the maximum voltage change (i.e. deltaV) is relatively small (e.g. it may be 21.48 mV for a Vdd 692 voltage of 750 mV in one particular embodiment). This relatively smaller deltaV means that the amount of energy that can be stored on each DEP capacitor is ½*C*deltaV² in a low-voltage DEP embodiment, with C being the capacitance of DEP capacitors 660A and 660B. In contrast, a high-voltage DEP system is configured with a high-voltage energy storage capacitor in a different position where a larger deltaV is possible so that more energy can be stored, as will be described in detail with FIG. 15 below.

Returning to the operation of one or more embodiments of the low voltage DEP implementation: For low voltage DEP, energy is stored on DEP capacitors connected to the output of the voltage regulator. Before commencement of a sequence of operations, the DEP capacitors are charged to a slightly higher Vdd than the nominal value for the target operating mode. For example, in one embodiment, the DEP capacitors can be charged 3% higher, or 21.48 mV higher than the nominal Vdd of 716 mV. The extra 3% higher Vdd stores an amount of energy in Joules calculated as ½*Cdep*deltaV, where Cdep is the capacitance of the DEP capacitors, e.g. 300,000 uF, and deltaV is the magnitude of the Vdd increase, e.g. 21.48 mV, so the energy stored=0.5*0.3*0.02148*0.02148=69.2 uJ, which is equivalent to providing an extra 96.65 Amps for 1 uS at 0.716V.

In accordance with one or more embodiments, when the load device draws more power than the input power rail limit can support, the DEP regulator limits the input power to no more than the specified value, and the output voltage is allowed to droop slightly lower during the peak load period, drawing down some portion of the energy stored on the DEP capacitors.

Figure 7:
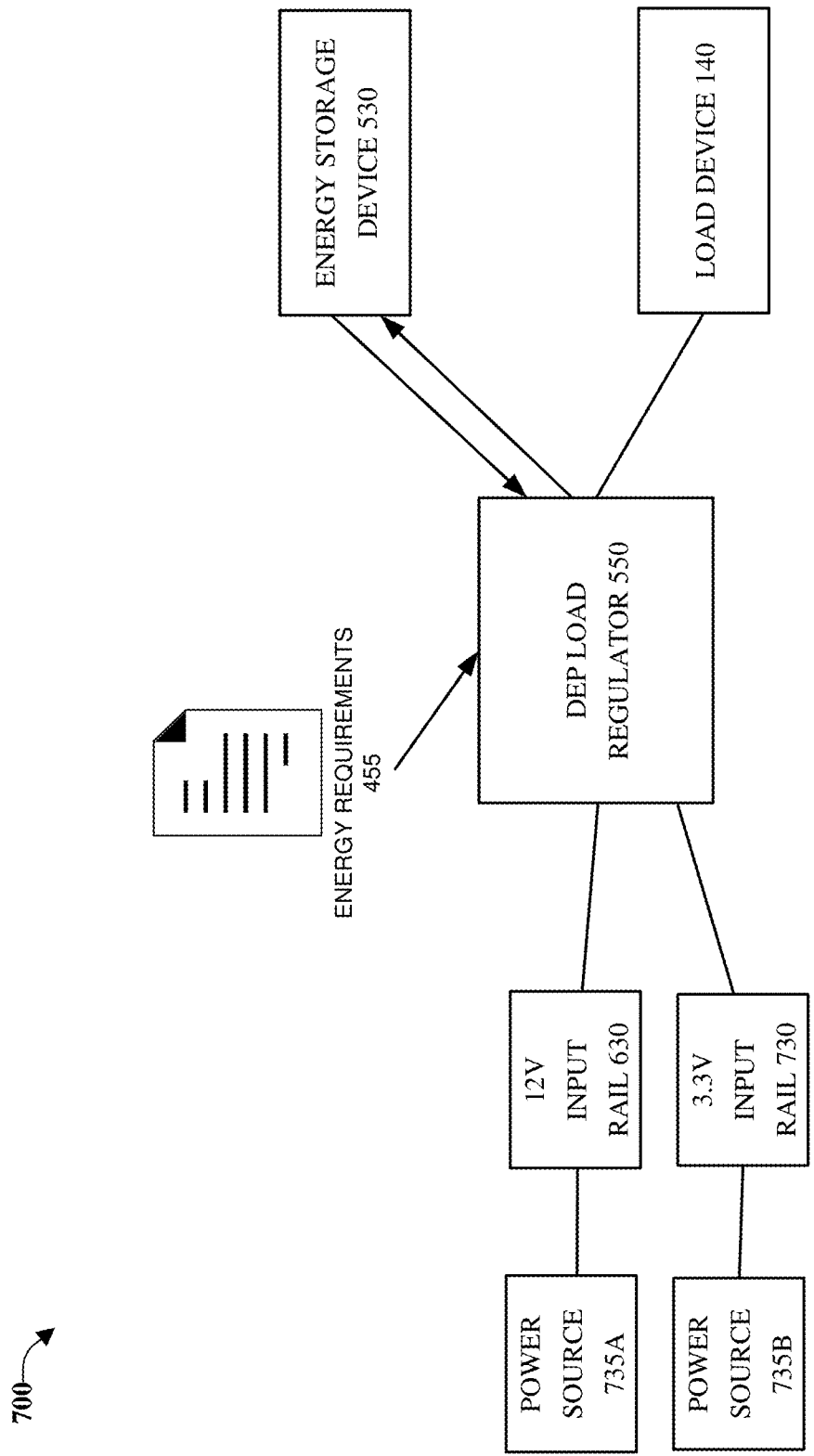
FIG. 7 depicts a detailed block diagram of a non-limiting, example embodiment of a system for deterministic energy provisioning for the device for different operating states of the device over time based on pooling multiple power sources, in accordance with one or more embodiments described herein.

FIG. 7 depicts a detailed block diagram of a non-limiting, example embodiment of system 700 for deterministic energy provisioning for the device for different operating states of the device over time based on pooling multiple power sources, in accordance with one or more embodiments described herein. For purposes of brevity, description of like elements and/or processes employed in other embodiments described below, is omitted.

FIG. 7 includes DEP load regulator 550 receiving power provisioned by 12V input power rail 630 and 3.3V input power rail 730. Energy requirement 455 provides deterministic energy provisioning information for DEP load regulator 550 to either store excess provisioned power as stored energy on energy storage device 530, or provide provisioned power (with extra provisioned power, if needed) in response to load demand of load device 140.

With respect to additional input power rail 730, although in FIGS. 5 and 6, a single input power rail 630 is depicted (e.g., with a constant voltage of 12V and current drawn regulated to be at 5.5 A), alternative embodiments depicted starting at FIG. 7 below depict multiple power sources 735A-B respectively providing power to 12V input rail 630 and 3.3V input rail 730. One or more embodiment pool multiple input power rails (e.g., 12V input power rail 630 and a 3.3V input power rail 730) to provide power, e.g., to load device 140. This feature can be useful for some implementations of embodiments, e.g., a power supply system may have multiple input power rails (e.g., 12V and 3.3V), but some of these rails may not (without the use of DEP) be incorporated into the power provided. For example, available power from 3.3V input power rail 730 may not (without the use of DEP) be combined with the available power from the 12V input power rail 630 to supply a particular load device, and for this reason the load device may have insufficient operating power available for certain functions.

As discussed herein, one or more embodiments of power supply regulator circuits described herein can, among other benefits, provide solutions for situations where the total available power can be supplied through a combination of different input power rails, where the different input power rails have different maximum power limits (or other relevant limitations), and where the performance of the target device could be significantly degraded if power could be drawn from only a subset of the available input power rails.

Thus, as discussed with FIGS. 8-13 below, in addition to the use of DEP to exploit deterministic patterns of power usage, one or more embodiments harvest energy from more than one supply rail. This enables shorter recovery times and minimized latency by combining all energy sources into a common pool, and storing large amounts of energy in a high-voltage capacitor for use in response to peak demand loads.

Figure 8:
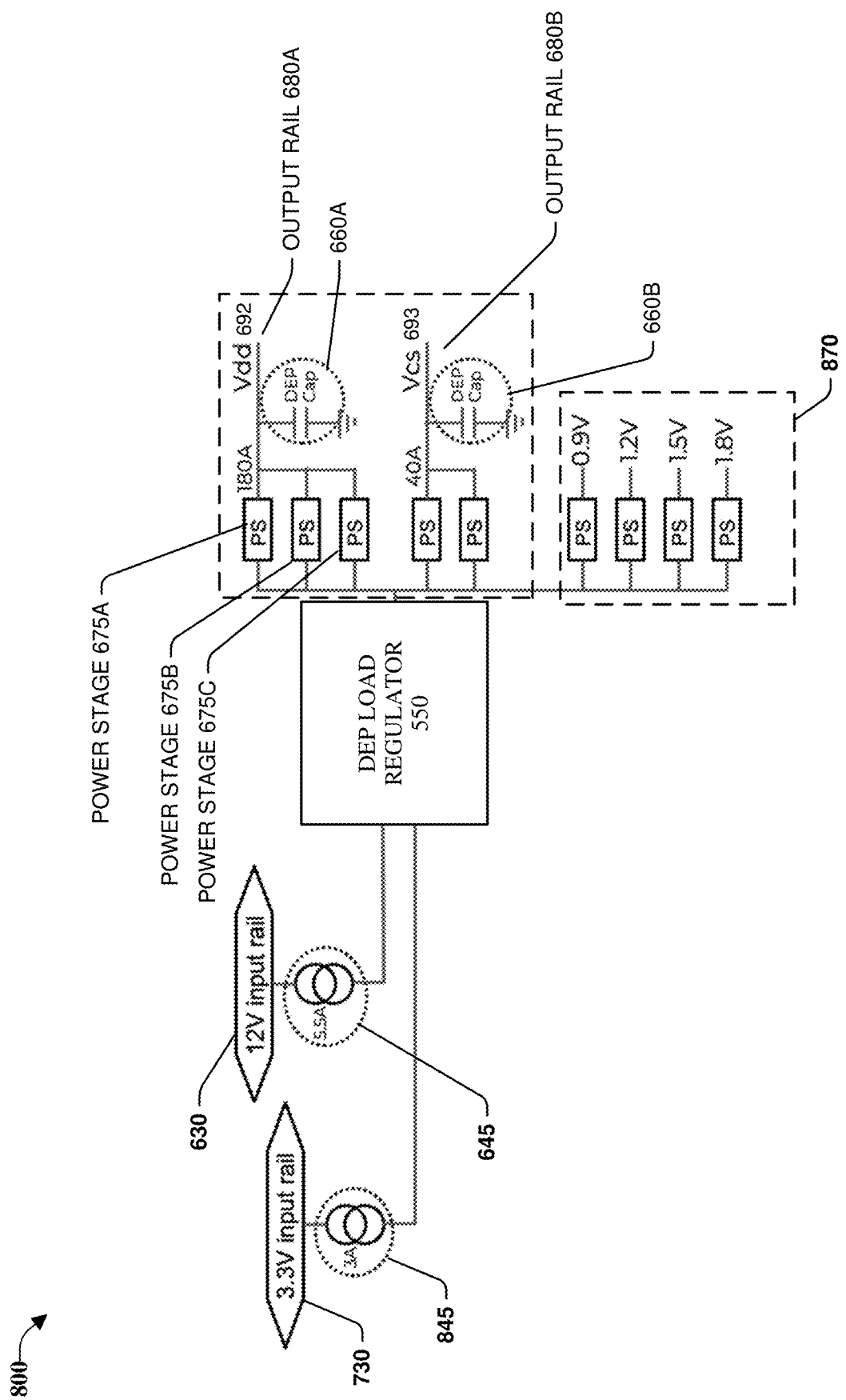
FIG. 8 depicts a detailed block diagram of a non-limiting, example embodiment of a system for a 'low-voltage' deterministic energy provisioning system based on pooling multiple power sources, in accordance with one or more embodiments described herein.

FIG. 8 depicts a detailed block diagram of a non-limiting, example embodiment 800 of system 800 for a 'low-voltage' DEP system that can utilize pooling of multiple power sources, in accordance with one or more embodiments described herein. For purposes of brevity, description of like elements and/or processes employed in other embodiments described below, is omitted.

As depicted, system 800 includes 12V input power rail 630, 3.3V input power rail 730, DEP load regulator 550, power stages 675, output rails 680A-680B, and DEP capacitors 660A-B. Generally speaking, the embodiment depicted in FIG. 8 is a low-voltage implementation in comparison to a so-called high-voltage implementation depicted in FIG. 12 below. It should be considered that this 'low-voltage' descriptor is non-limiting (e.g., different inputs, storage, and voltages can be handled by both implementations).

In one or more embodiments, power from multiple power input power rails is pooled by DEP load regulator 550, and uses provisioned power output to load device 140. In one or more embodiments, pooled input power rails have varied performance characteristics and independent sources. The pooled input power rails can, in one or more embodiments, be the same voltage, slightly different voltages, or significantly different voltages.

Figure 9:
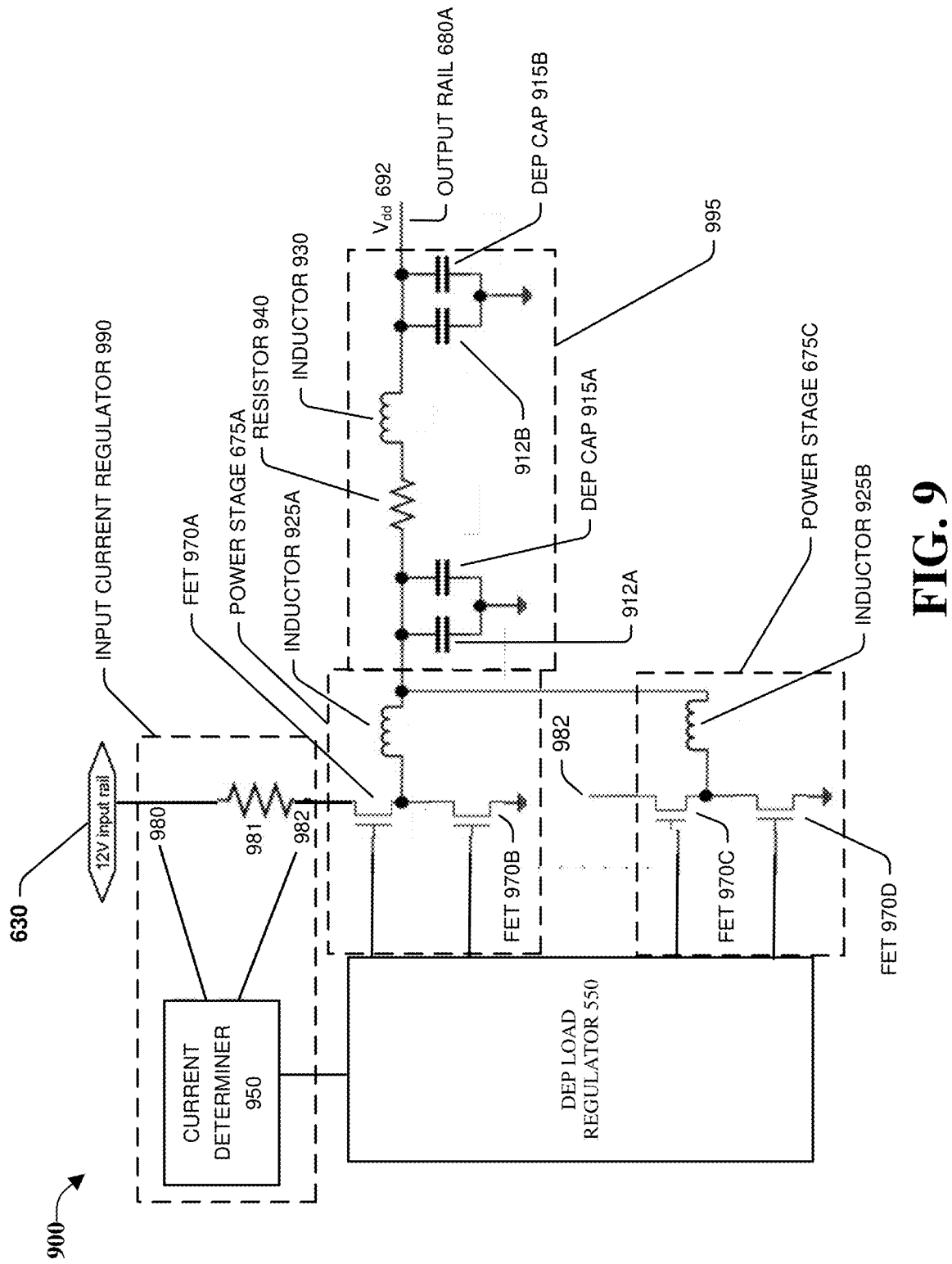
FIG. 9 depicts a circuit diagram of a non-limiting, example embodiment of a 'low-voltage' system for deterministic energy provisioning for the device for different operating states of the device over time, in accordance with one or more embodiments described herein.

FIG. 9 depicts a circuit diagram 900 of components for a partial implementation of the low-voltage DEP system 800, described above with FIG. 8. For purposes of brevity, description of like elements and/or processes employed in other embodiments described below, is omitted. Circuit diagram 900 depicts DEP load regulator 550, input current regulator 990, power stages 975A and 975C, and pi filter 995, with input rail 630 connected through shunt resistor 981 to both power stages 675A and 675C, and output rail 680A coupled to pi filter 995.

Input current regulator 990 includes current determiner 950 and shunt resistor 981. One having skill in the relevant art(s), given the disclosure herein will appreciate that current determiner 950 can determine the current of the power provided by 12V input rail 630 by measuring the voltage across current regulator shunt resistor 981 on nodes 980 and 982. It should be noted that input current regulator 990 is a representation of an example embodiment of input current regulation properties 645 of DEP load regulator 550, as discussed with FIGS. 6 and 8 above. It should be further be noted that, although input current regulator 990 is depicted outside of DEP load regulator 990, in one or more embodiments, this component can be included within DEP load regulator 550. In an example where the functions of current determiner 950 are performed by DEP load regulator 550 (not shown), output 980 of 12V input rail 630 is connected to the FBH pin of DEP load regulator 550 and resistor output 982 is connected to the FBL pin of DEP load regulator 550.

Pi filter 995 shows an example implementation of DEP capacitor 660A discussed with FIGS. 6 and 8 above. In this example, pi filter 995 includes filter capacitors 912A and 912B (also termed decoupling capacitors) and low-voltage DEP energy storage capacitors 915A and 915B. As depicted, resistor 940 is a representation of distributed parasitic resistance of the printed circuit board (PCB) traces from the output of regulator power stages 675A-C to the Vdd 692 pin of the load device via output rail 680A.

Power stages 675A and 675C are depicted, in this example implementation, as including FETs 970A and 970C, respectively, receiving power from 12V input rail 630 via input current regulator 990, e.g., shunt resistor 981 output 982.

Power stages 675A and 675C are coupled to pi filter 995 via inductors 925A and 925B, respectively. As depicted, inductor 930 represents the distributed parasitic inductance of the PCB traces from the output of regulator power stages 675A-C to the Vdd 692 input of the load device via output rail 680A.

Figure 10:
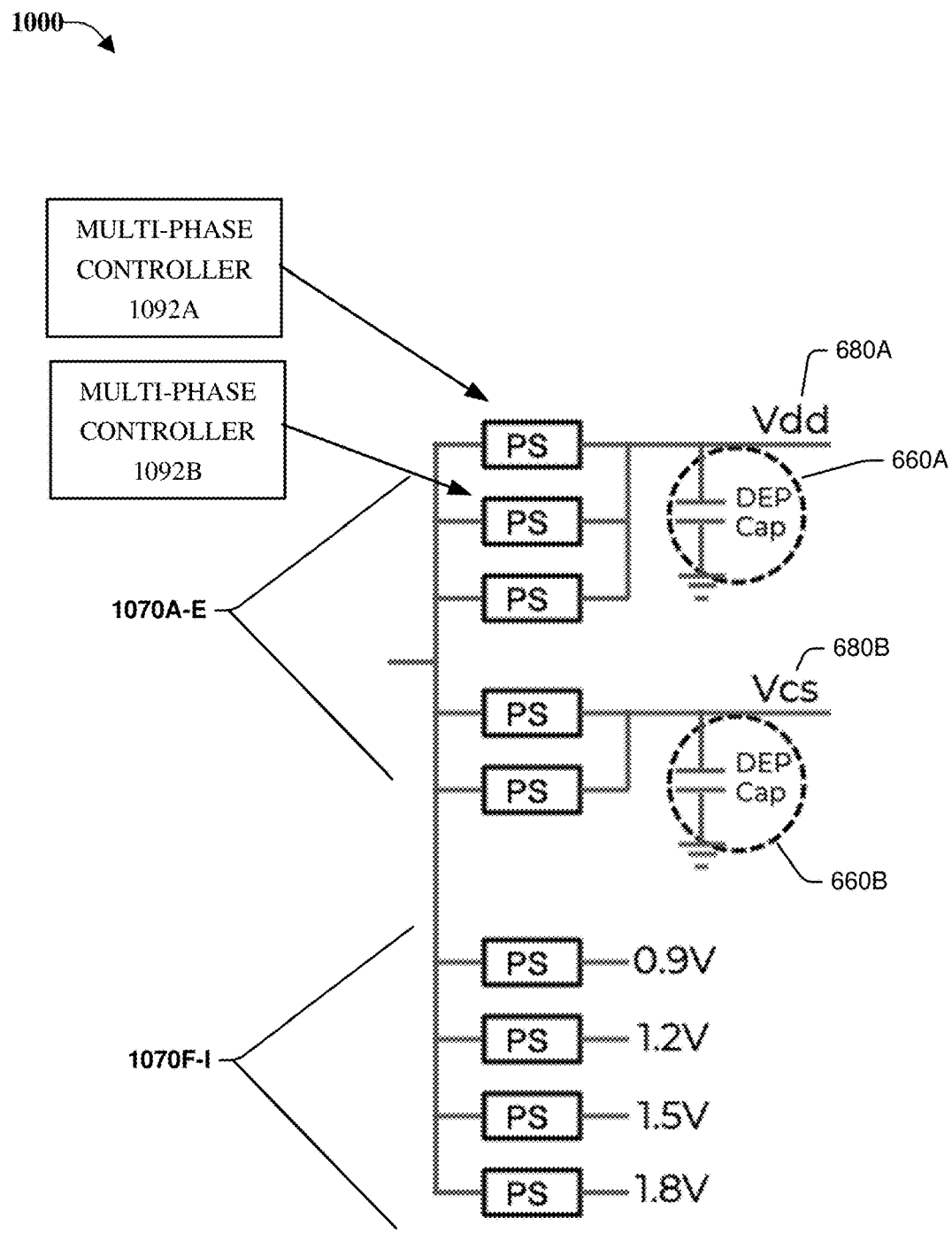
FIG. 10 depicts a detailed block diagram of a non-limiting, example embodiment of a system for utilizing power stages to deliver power via output rails to load device, in accordance with one or more embodiments described herein.

FIG. 10 depicts a detailed block diagram of a non-limiting, example embodiment of a power supply regulator circuit 1000 for utilizing power stages to deliver power via output rails to a load device, in accordance with one or more embodiments described herein. As described below, power supply regulator circuit 1000 utilizes power stages 1070A-E to regulate the output voltage provided via output rails 680A-B to load device 140, in accordance with one or more embodiments described herein. For purposes of brevity, description of like elements and/or processes employed in other embodiments described below, is omitted.

The power supply regulator circuits described with some embodiments above may provide one or more output rails 680A-B where the combined power output does not exceed the maximum available power input from the combination of input power rails and where the combination of load currents supplied by any one input power rail does not exceed the maximum power specification for that particular input power rail. As depicted, in one or more embodiments described herein, output rails 680A-B can be formed by connecting two or more power stage outputs to the same output rail, e.g., power stages 1070A-C and 1070D-E forming output rails 680A-B respectively.

As depicted, in one or more embodiments described herein, output rails 680A-B can be formed by connecting two or more power stage outputs to the same output rail, e.g., power stages 1070A-C and 1070D-E forming output rails 680A-B respectively.

In one or more embodiments, a multiplicity of multi-phase controllers 1092A-B can be used to build power supply regulator circuit 1000, where each multi-phase controller can control one or more power stages, with each power stage assigned to a phase position, e.g., power stages 1070A-B being controlled by multi-phase controllers 1092A-B.

Some embodiments can synchronize and coordinate multi-phase controllers 1092A-B such that different power stages 1070A-B are assigned to different phases, and if more power stages are required than the number of phases available, then power stages can be driven in parallel by the same phase. One way to drive power stages in parallel is to combine two power stages associated with the same input power rail to avoid contention, in accordance with one or more embodiments.

Another embodiment interleaves power stage phases such that each input power rail is substantially uniformly distributed across the full period of the multi-phase controller control loop. In one or more embodiments, special engineering considerations such as loadline analysis are applied to improve the likelihood that the combination of power stages reliably power up. Additionally, other engineering considerations such as minimum load current may be applied to ensure that one power stage is not in contention with other power stages.

Figure 11:
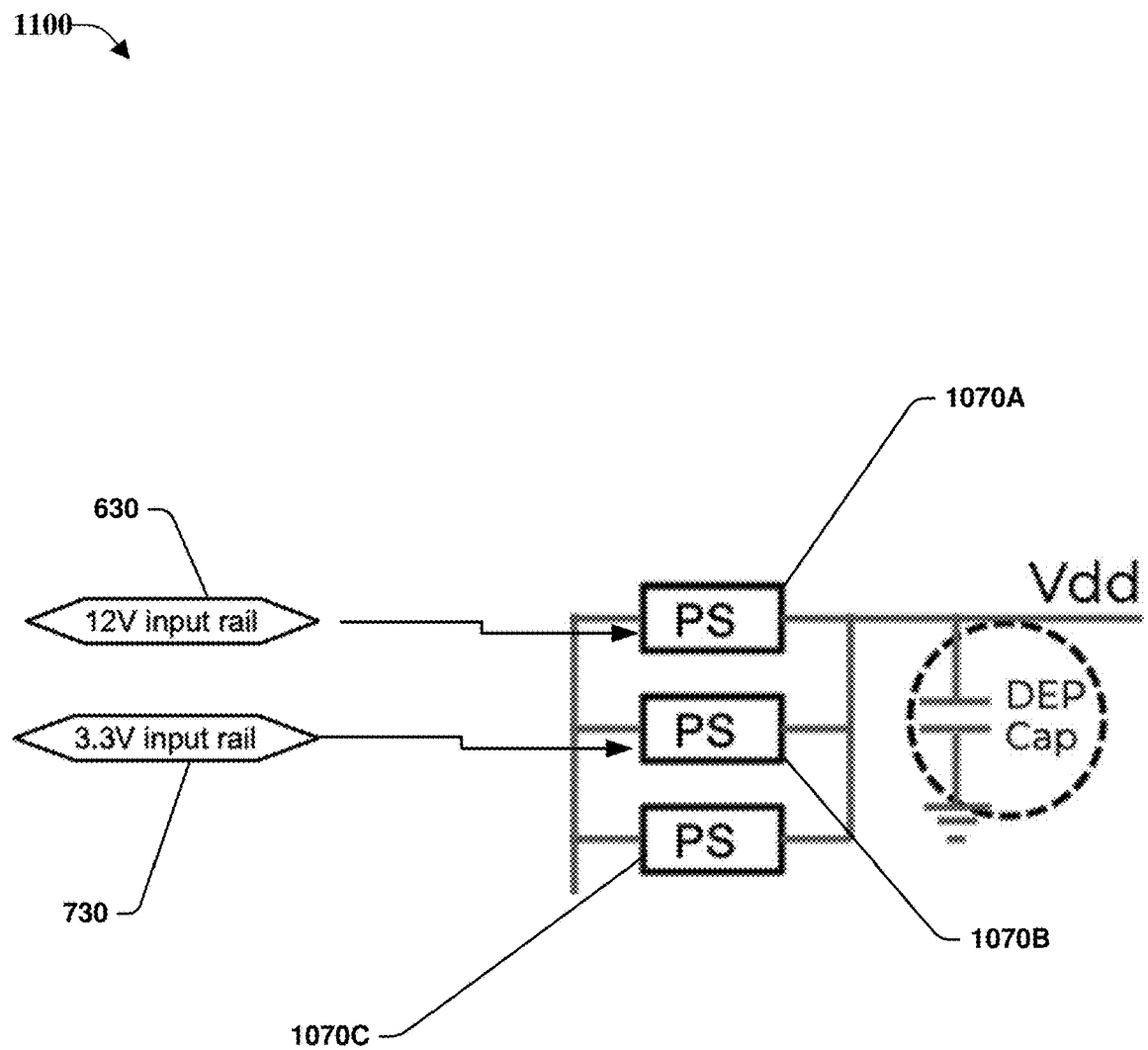
FIG. 11 depicts a detailed block diagram of a non-limiting, example embodiment of system 1100 that combines different power sources and power stages, in accordance with one or more embodiments described herein.

FIG. 11 depicts a detailed block diagram of a non-limiting, example embodiment of system 1100 that combines different power sources and power stages, in accordance with one or more embodiments described herein. For purposes of brevity, description of like elements and/or processes employed in other embodiments described below, is omitted.

In one or more embodiments described herein, power stages regulate output rail 680A-B voltages. When energy is pooled, e.g., as discussed with FIGS. 7, 8, and 13, allocating different power sources to different power stages can provide additional flexibility. For example, input power rails working from independent sources are assigned to one or more power stages, and may be the same voltage, slightly different voltages, or significantly different voltages. An output rail from power stages may be voltage regulated or current regulated (or both in conjunction). For example, in one or more embodiments, allocating power from 12V input power rail 630 and 3.3V input power rail 730, the rails are separately allocated to power stages 1070A-B respectively.

Figure 12:
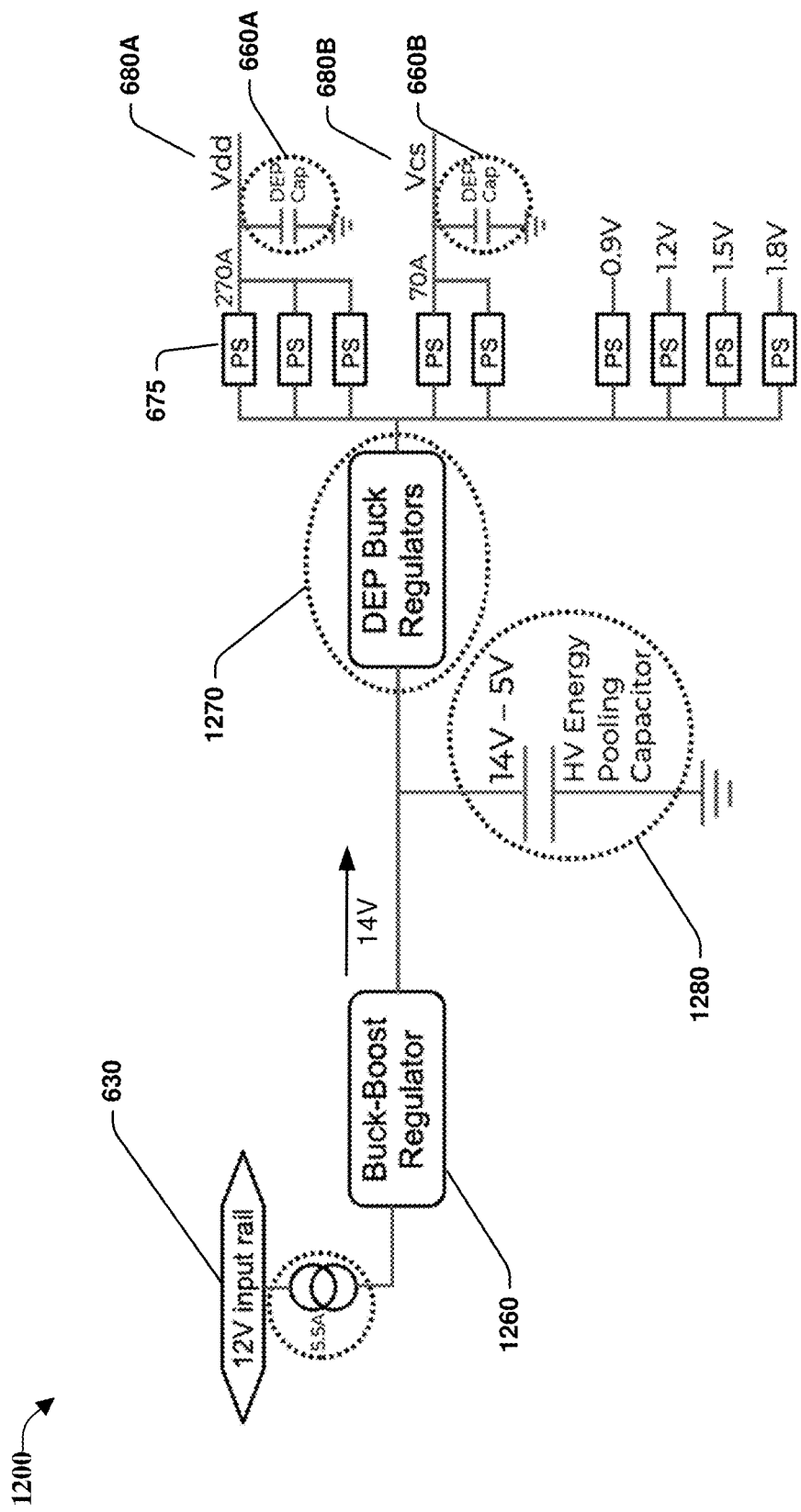
FIG. 12 depicts a detailed block diagram of a non-limiting, example embodiment of a system for 'high-voltage' deterministic energy provisioning for the device for different operating states of the device over time, in accordance with one or more embodiments described herein.

FIG. 12 depicts a detailed block diagram of a non-limiting, example embodiment of system 1200 for 'high-voltage' deterministic energy provisioning for the device for different operating states of the device over time, in accordance with one or more embodiments described herein. For purposes of brevity, description of like elements and/or processes employed in other embodiments described below, is omitted.

As depicted, system 1200 includes 12V input power rail 630, buck-boost regulator 1260, high-voltage energy pooling capacitor 1280, DEP buck regulators 1270, power stages 675, output rails 680A-B, and DEP capacitors 660A-B. Generally speaking, the embodiment depicted on FIG. 12 is a high-voltage implementation in comparison to a so-called low-voltage implementation described with FIG. 6 above. As with FIG. 6, it should be considered that these high-voltage and low-voltage descriptors are non-limiting, e.g., different input, storage, and output voltages can be handled by both implementations. Different components utilized for, and different functional characteristics of, the two embodiments are discussed herein.

In one or more embodiments, the low-voltage example of FIG. 6 and this high-voltage example in FIG. 12 both implement the DEP approach. As discussed further below, the example of FIG. 12 has a different structure compared to the example of FIG. 6, and further, utilizes components that are not used with the example of FIG. 6.

Further comparing the examples of FIG. 6 and FIG. 12, as noted above, system 1200 includes an additional power regulator component, e.g., input current regulator component 1260. As would be appreciated by one having skill in the relevant art(s), given the information described herein would appreciate that, in some circumstances, the addition of input current regulator component 1260 can reduce the efficiency of system 1200, as compared to system 600. However, the advantage of the DEP stored energy of the system 1200 can be more beneficial overall than the efficiency reduction caused by the introduction of regulator component 1260.

One feature of the embodiments of FIG. 12 is the use of buck-boost regulator 1260 to provide an output current that charges high-voltage energy pooling capacitor 1280 to store energy for later use, while limiting the input power rail current to no more than 5.5 A from 12V input power rail 630. Because energy is stored on high-voltage energy pooling capacitor 1280, the output power that is available at output rails 680A-B is greater than the constant amount of power provisioned by 12V input power rail 630, e.g., providing extra power to boost performance of load device 140, in some circumstances.

One or more embodiments of system 1200 guarantee that 12V input power rail 630 is actively regulated at a selected current (e.g., 5.5 A) 3.3V input power rail 730 is actively regulated at a selected current (e.g., 3 A). In an example implementation this configuration produces 75 Watts of power, with 12V input power rail 630 providing up to 66 W (e.g., 12V*5.5 A), and 3.3V input power rail 730 providing up to 9.9 W (e.g., 3.3V*3 A). One or more embodiments continually draws this wattage, e.g., utilizing a constant 12V source and a constant 3.3V source, and maintaining a constant current draw of 5.5 A and 3 A of current respectively.

In contrast, in a conventional approach, the 9.9 W of the 3.3V input power rail 730 would not be combined with the 66 Watts of the 12V input power rail 630, and the available 66 W could be consistently provided by 12V input power rail 630, but in many instances, not all of the power would be used for an operating state of load device 140. e.g., as depicted by excess power provided 270 in FIG. 2.

To facilitate this constant voltage with regulated current, in one or more embodiments, when a power schedule indicates that the demand wattage for an operating state will require a draw of current that exceeds 5.5 A at 12V input rail 630 and 3A at 3.3V input rail 730, stored energy can be utilized (e.g., stored on high-voltage energy pooling capacitor 1280) to provide the excess demand load, e.g., as depicted as excess demand load 250 in FIG. 2. High-voltage energy pooling capacitor 1280 is positioned between buck-boost regulator 1260 coupled to 12V input rail 630 and boost regulator 1350 coupled to 3.3V input rail 730, and DEP buck regulator 1270.

Because, in some implementations, high-voltage energy pooling capacitor 1280 stores large amounts of energy for uses including, but not limited, to responses to peak demand loads, deltaV is relatively larger for this capacitor than is for DEP capacitors 660A and 660B, discussed with FIG. 6 above, e.g., with deltaV$^2$ 9V (the lower limit of 5V subtracted from the upper limit of 14V). High-voltage energy pooling capacitor 1280 is able to store energy equal to ½C*deltaV$^2$. In this example, with deltaV being 9V, and the capacitance of the resistor (C) being from 300 to 30,000 micro Farads (μF), the resulting energy that can be stored corresponds to from to 1.22 Joules.

This relatively larger deltaV (e.g., relatively larger than 21.48 mV for the embodiment of FIG. 6) means that the amount of energy that can be stored is larger than DEP capacitors 660A and 660B, discussed above.

Returning to the operation of one or more embodiments of the high-voltage DEP implementation: For high voltage DEP, energy is stored on the high-voltage energy storage capacitor. A significant difference with the high-voltage DEP compared to the low voltage DEP, is that the change in voltage on the high-voltage energy storage capacitor is substantially larger than with low voltage DEP, e.g. the high-voltage energy storage capacitor can be operated between 14V to 5V for a deltaV=14−5=9V, so with a 30,000 uF capacitor, the energy stored is 0.5*0.03*9*9=1.22 J which can provide an extra 170 Amps for 10 mS at 0.716V. The amount of energy stored in the capacitor increases quadratically with the magnitude of the deltaV.

The above description illustrates the substantially larger energy storage capacity of the high-voltage DEP. However, high-voltage DEP embodiments require additional regulator circuits which increase the number of components, adding to the cost of components and using additional area on the circuit board. Also, the additional regulator stages also reduce the efficiency of the supply e.g., in some implementations, a 15% higher cost of parts, and a 5% lower power conversion efficiency than low voltage DEP.

Figure 13:
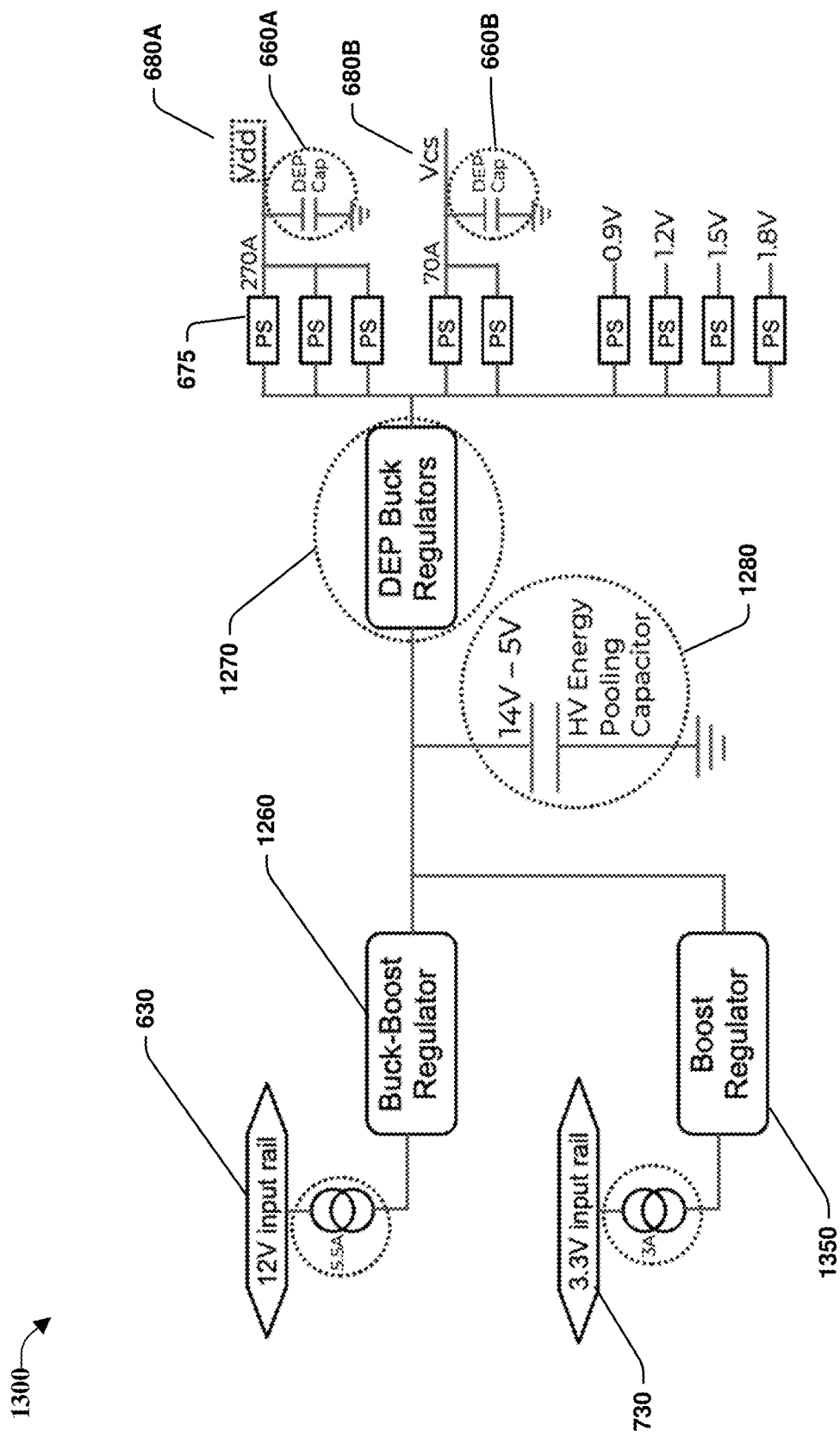
FIG. 13 depicts a circuit diagram of a non-limiting, example implementation of a system for 'high-voltage' deterministic energy provisioning for the device based on pooling multiple power sources, in accordance with one or more embodiments described herein.

FIG. 13 depicts a circuit diagram of a non-limiting, example implementation of a 'high-voltage' deterministic energy provisioning system 1300, based on pooling multiple power sources, in accordance with one or more embodiments described herein. For purposes of brevity, description of like elements and/or processes employed in other embodiments described below, is omitted. As depicted, system 1300 includes 12V input power rail 630, 3.3V input power rail 730, buck-boost regulator 1260, boost regulator 1350, high-voltage energy pooling capacitor 1280, DEP buck regulator 1270, power stages 675, output rails 680A-B, and DEP capacitors 680A-B.

In this example, as discussed with FIGS. 7 and 8 above, the provisioned power of 3.3V input power rail 730 can be beneficially combined with 12V input power rail 630 to harvest more provisioning capacity that was unused, and provision more power to support load device 140. One structural difference between the pooled high-voltage embodiment of FIG. 13 and the pooled low-voltage embodiment of FIG. 8 is the addition of boost regulator 1350. As discussed in the non-pooled high-voltage example of FIG. 12 above, in some embodiments 12V input power rail 630 can be voltage boosted to 14V by buck-boost regulator 1260, with current regulated at 5.5 A. In this example of FIG. 13, pooled 3.3V input power rail 730 has its voltage boosted and current regulated at a constant value, e.g., 3.3V boosted by boost regulator 1350 to 14V, with input rail current regulated by boost regulator 1350 at 3A.

Figure 14:
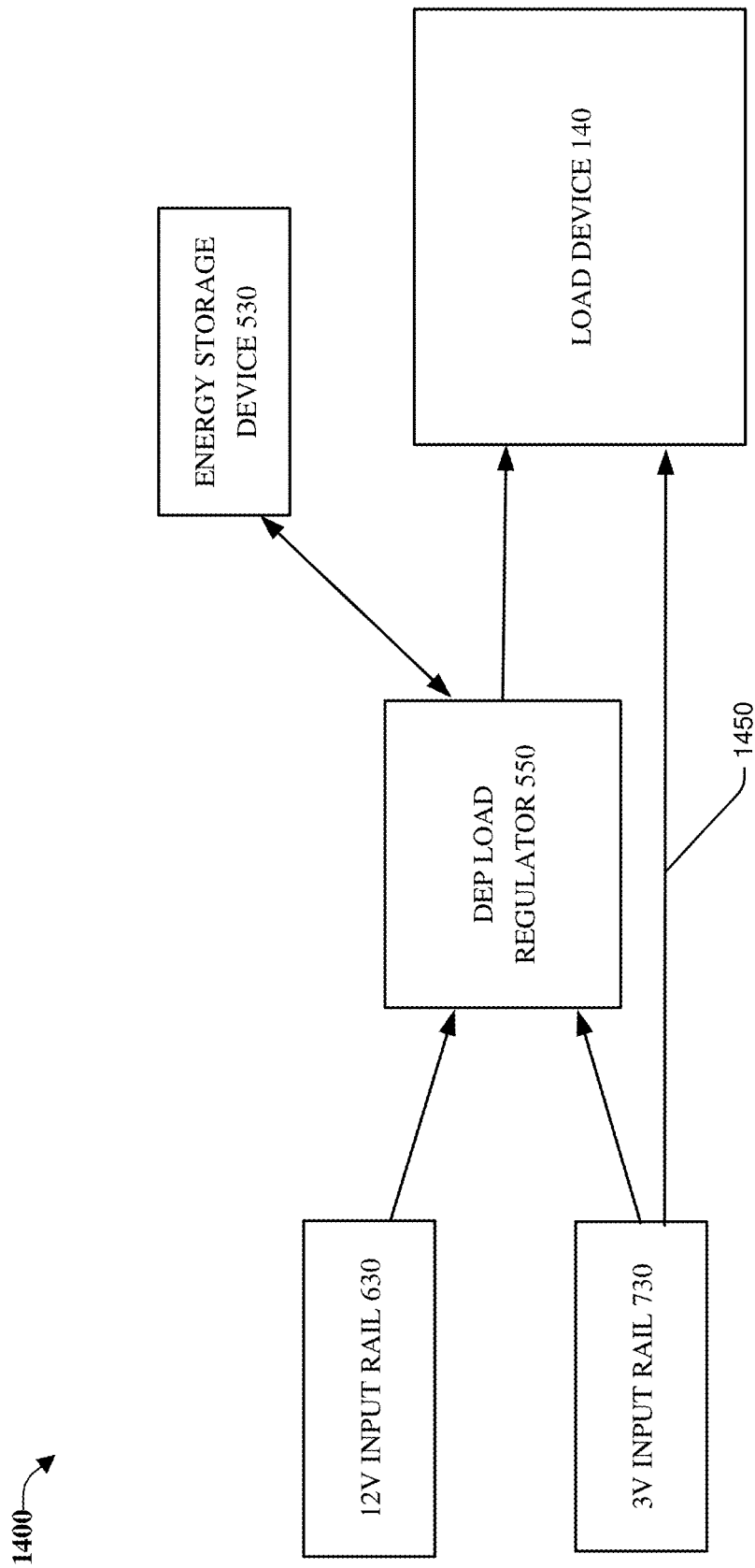
FIG. 14 depicts a block diagram of a non-limiting example embodiment that illustrates an approach to deterministic energy provisioning for two combined power sources, with an alternate output path for one of the power sources, in accordance with one or more embodiments.

FIG. 14 depicts a block diagram of a non-limiting example system 1400 that illustrates an approach to deterministic energy provisioning for two combined power sources, with an alternate path for one of the power sources, in accordance with one or more embodiments. For purposes of brevity, description of like elements and/or processes employed in other embodiments described below, is omitted. As depicted, system 1400 includes, 12V input power rail 630, 3.3V input power rail 730, DEP load regulator 550, energy storage device 530, and load device 140.

In contrast to the similar example system 700 of FIG. 7, system 1400 further includes non-storage connection 1450 to provide an option for one or more load devices that do not use DEP stored energy to augment power from one or more power sources (e.g., 3.3V input power rail 730) where the total input current from the input power rail is regulated by the DEP regulators. One having skill in the relevant art(s), given the disclosure herein, would appreciate that this bypass mechanism efficiently delivers power to load device 140 that either i) do not require energy storage, or ii) do not present a deterministic energy usage pattern. Specific embodiments of system 1400 are discussed with FIG. 15 below.

Figure 15:
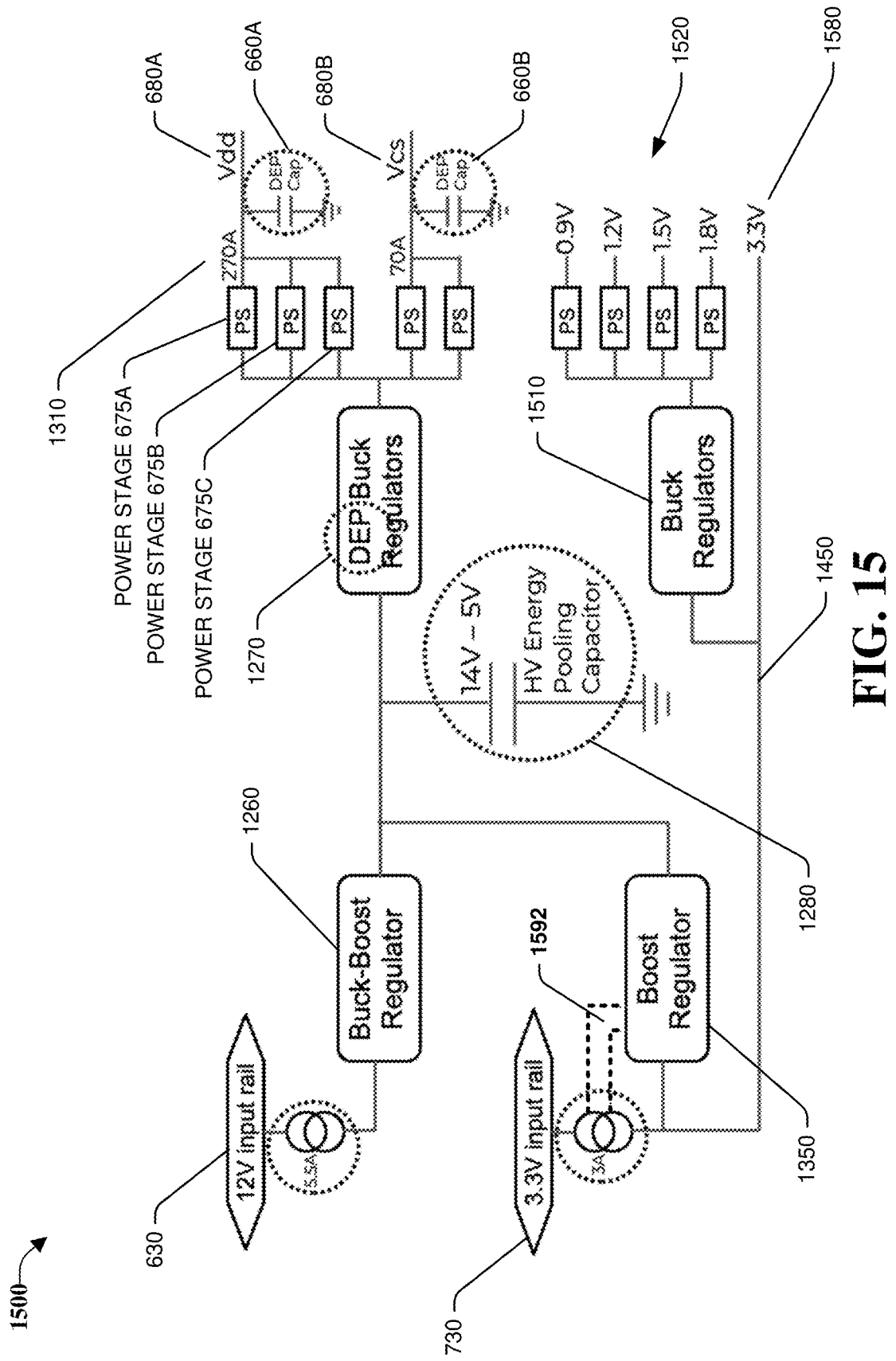
FIG. 15 depicts a block diagram of a non-limiting, example implementation of a system for 'high-voltage' deterministic energy provisioning for one set of power stages, and a current-managed, non-storage approach for a different selected set of power stages, in accordance with one or more embodiments.

FIG. 15 depicts a block diagram of a non-limiting, example implementation of a system 1500 for 'high-voltage' deterministic energy provisioning for one set of power stages, and a current-managed, non-storage approach for a different selected set of power stages, in accordance with one or more embodiments. For purposes of brevity, description of like elements and/or processes employed in other embodiments described below, is omitted.

As depicted, system 1500 is an energy pooled, high-voltage example, that includes 12V input power rail 630, 3.3V input power rail 730, buck-boost regulator 1260, boost regulator 1350, high-voltage energy pooling capacitor 1280, DEP buck regulators 1270, power stages 675A-C, output rails 680A-B, and DEP capacitors 660A-B. In contrast to the similar example system 1300 of FIG. 13, system 1500 further includes non-storage connection 1450 discussed above with FIG. 14, e.g., to provide an option for one or more power sources (e.g., 3.3V input power rail 730) to provide power to selected load devices that will not be supplied by the DEP energy storage systems described herein.

As depicted, one or more embodiments can provide power from the 3.3V input power rail 730 via non-DEP storage connection 1450 to buck regulators 1510 for voltage regulation and allocation to non-DEP storage output rails 1520. One having skill in the relevant art(s), given the disclosure herein, would appreciate that this bypass, in circumstances where DEP storage may be less beneficial, can improve the efficiency of the delivery of power provided by non-storage output rails 1520 and 1580.

It should be noted that, as discussed with FIG. 9 above, current of 3.3V input rail 730 can be regulated, e.g., by selectively boosting the voltage of the 3.3V input rail 730. In one or more embodiments, this boosting can be controlled by measuring 1592 the current across a shunt resistor (not shown), and providing this current value to boost regulator 1350, e.g., to increase the voltage as needed.

For further performance benefits in some circumstances, as depicted, one or more embodiments can provision power from 3.3V input power rail 730 through a current regulation shunt resistor (e.g., current regulator 990 and shunt resistor 981) and then directly to a load device via output rail 1580, e.g., without the voltage regulation of buck regulators 1510.

It should be noted that, with respect to the buck regulators, boost regulators, and buck boost regulators discussed with one or more of FIGS. 12, 13, and 15 above, in different implementations, depending on the particular input output voltage relationships of the system, combinations of one or more of these regulators can be used in place of the regulators depicted in these figures. For example, depending on the particular input output voltage relationships, any example boost regulator (e.g., boost regulator 1350) used to raise the input voltage to a higher level on the output could be instead a buck regulator (e.g., buck regulator 1510) to lower the input voltage to a lower level on the output, or it could be a buck-boost regulator (e.g., buck-boost regulator 1260) to lower or raise the output voltage according to the relationship of the input and output voltages.

In another example, depending on the particular input output voltage relationships, any example buck regulator used to lower the input voltage to a lower level on the output could be instead a boost regulator to raise the input voltage to a higher level on the output, or it could be a buck-boost regulator to lower or raise the output voltage according to the relationship of the input and output voltages. In yet another example, depending on the particular input output voltage relationships, any example buck-boost regulator used to lower or raise the input voltage to a lower or higher level on the output could be instead a buck regulator to lower the input voltage to a lower level on the output, or it could be a boost regulator to raise the output voltage according to the relationship of the input and output voltages.

Figure 16:
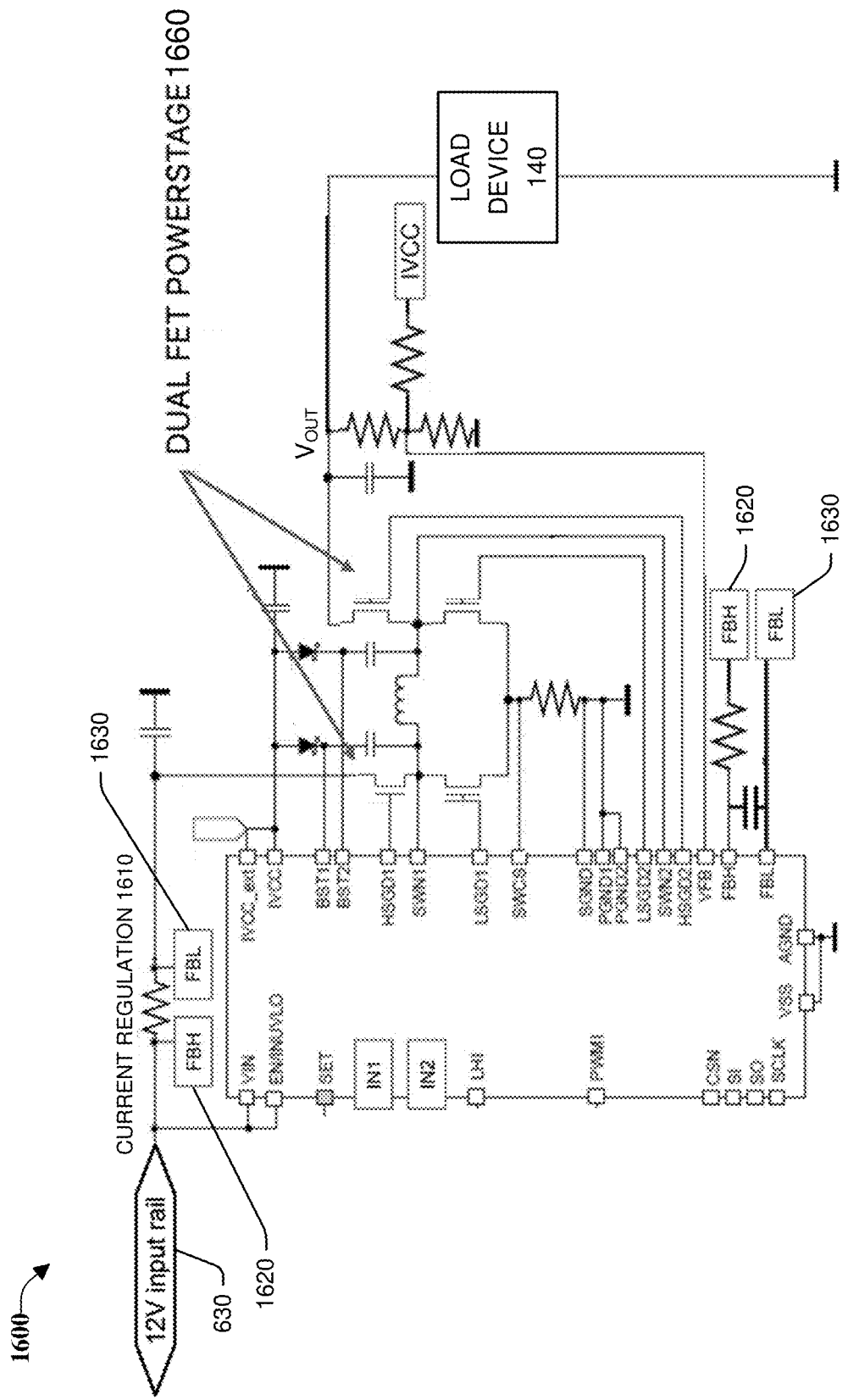
FIG. 16 depicts a circuit diagram of an example power regulator that can be used to implement one or more embodiments described herein.
Figure 17:
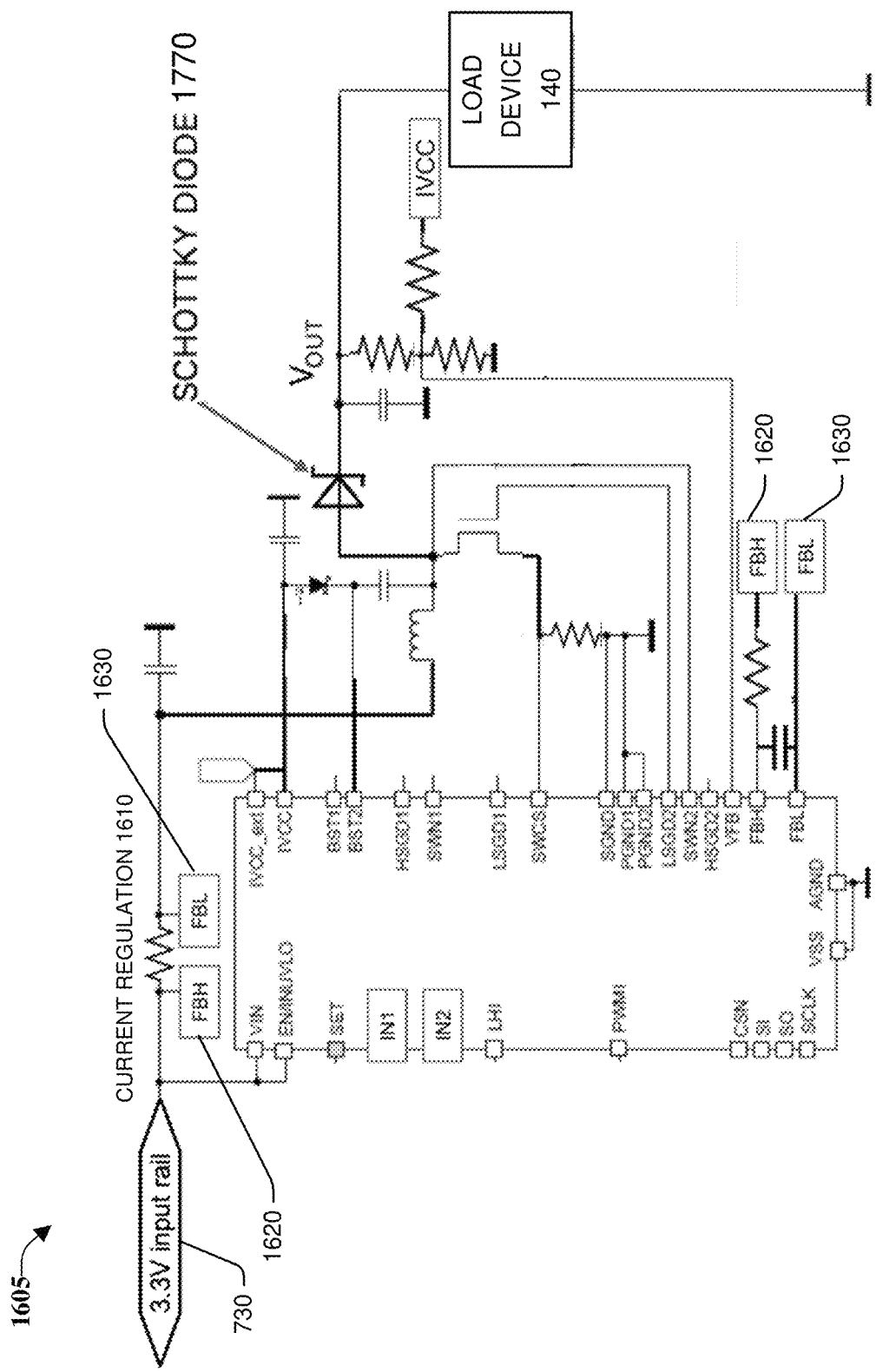
FIG. 17 depicts a circuit diagram of an example power regulator that can be used to implement one or more embodiments described herein.

FIGS. 16 and 17 depict a circuit diagram of example power regulators that implement one or more embodiments described herein. For purposes of brevity, description of like elements and/or processes employed in other embodiments is omitted.

FIG. 16 depicts a circuit diagram of an example buck-boost regulator 1600, in accordance with one or more embodiments. Buck-boost regulator 1600 includes 12V input rail 630, coupled to current shunt resistor 1610, where buck-boost regulator 1600 senses the voltage across shunt resistor 1610 via node 1620 connected to the FBH input of buck-boost regulator 1600 and node 1630 connected to FBL input of buck-boost regulator 1600. In one or more embodiments, the buck-boost functions of this regulator are enabled by dual FET powerstage 1660.

FIG. 17 depicts a circuit diagram of an example boost regulator 1700, in accordance with one or more embodiments. Boost regulator 1700 includes 3.3V input rail 730, coupled to current shunt resistor 1610 with pin connections to a DEP load regulator, e.g., DEP load regulator 550, discussed with FIGS. 5-6 above. In this example, FBH pin 1620 receives the voltage from one side of the current shunt resistor 1610 where it connects to the 3.3V input rail 630, and the FBL pin 1630 receives the voltage from the load side of the current shunt resistor 1610. In one or more embodiments, the boost functions of this regulator are enabled by Schottkey diode 1770.

Figure 18:
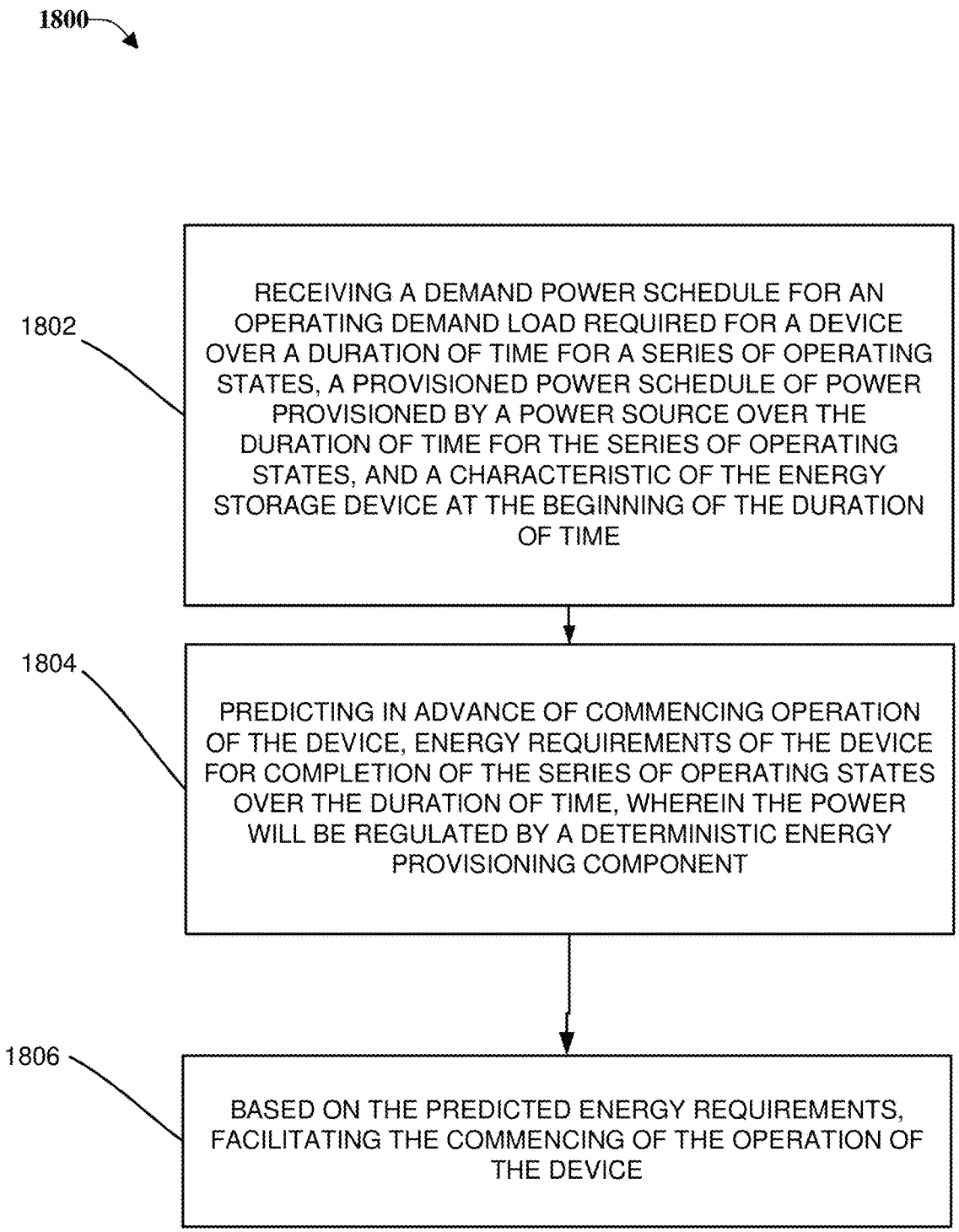
FIG. 18 depicts an example flow diagram for a method that can facilitate deterministic energy provisioning, in accordance with one or more embodiments.

FIG. 18 illustrates an example flow diagram for a method 1800 that can facilitate deterministic energy provisioning, in accordance with one or more embodiments. For purposes of brevity, description of like elements and/or processes employed in other embodiments is omitted. In this example, method 1800 of deterministic energy provisioning is provided, the method comprising 1802-1806 described below.

At 1802, the method comprises receiving a demand power schedule for an operating demand load required for load device 140 over a duration of time for a series of operating states, a provisioned power schedule of power provisioned by a power source over the duration of time for the series of operating states, and a characteristic of the energy storage device at the beginning of the duration of time;

At 1804, the method predicts in advance of commencing operation of the load device 140, energy requirements of the load device 140 for completion of the series of operating states over the duration of time, where the power is regulated by a deterministic energy provisioning component, and At 1806, the method comprises, based on the predicted energy requirements, facilitating the commencing of the operation of the load device 140.

Figure 19:
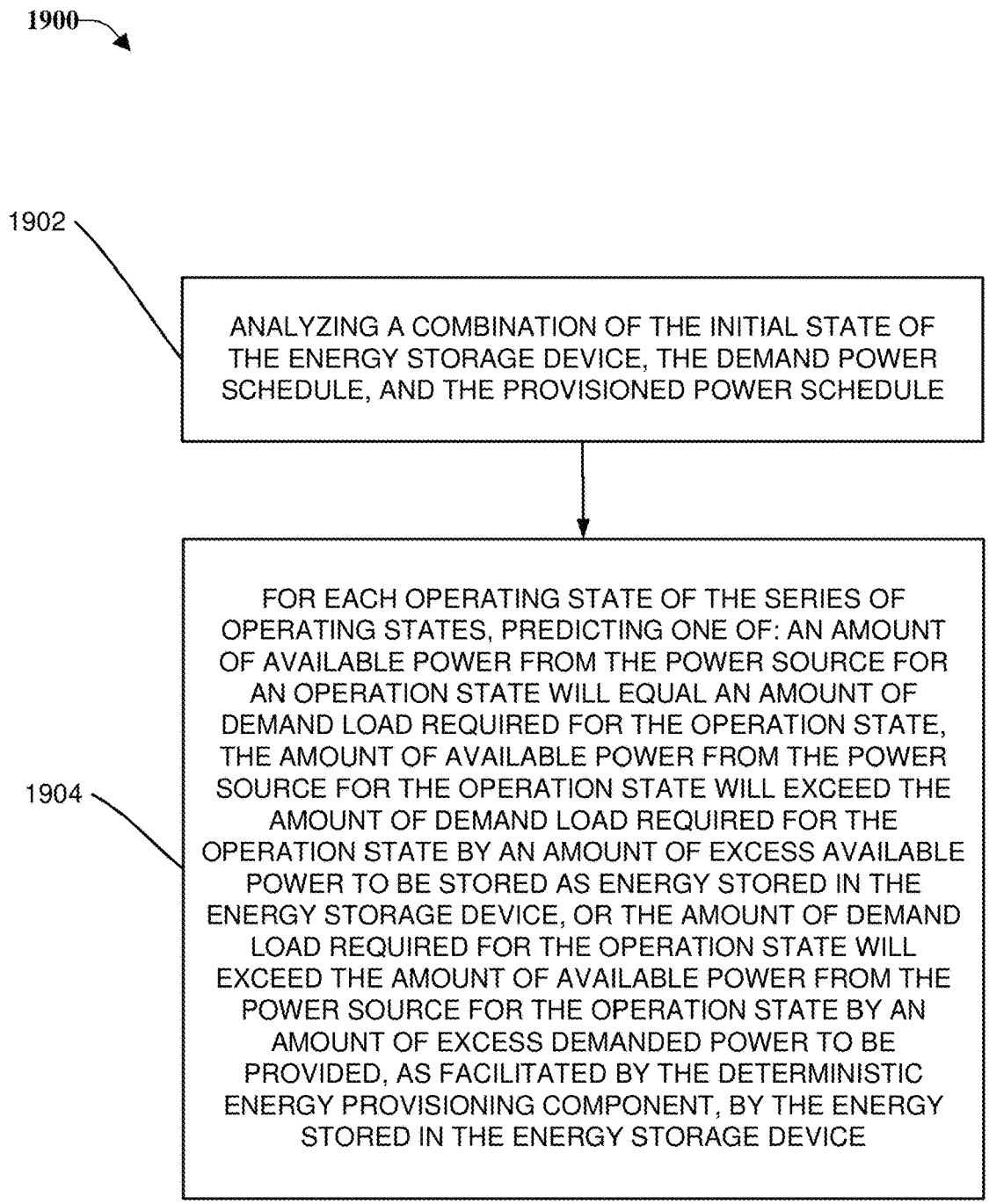
FIG. 19 depicts an example flow diagram for a method that can facilitate predicting the energy requirements of a device, in accordance with one or more embodiments.

FIG. 19 illustrates an example flow diagram for a method 1900 that facilitates predicting the energy requirements of load device 140, in accordance with one or more embodiments. For purposes of brevity, description of like elements and/or processes employed in other embodiments is omitted.

At 1902, the method comprises analyzing a combination of the initial state of the energy storage device, the demand power schedule, and the provisioned power schedule. At 1904, the method comprises, for each operating state of the series of operating states, predicting whether one of an amount of available power from the power source for an operating state will equal an amount of demand load required for the operating state, the amount of available power from the power source for the operating state will exceed the amount of demand load required for the operating state by an amount of excess available power to be stored as energy on the energy storage device, or the amount of demand load required for the operating state will exceed the amount of available power from the power source for the operating state by an amount of excess demanded power to be provided, as facilitated by the deterministic energy provisioning component, by the energy stored on the energy storage device.

Figure 20:
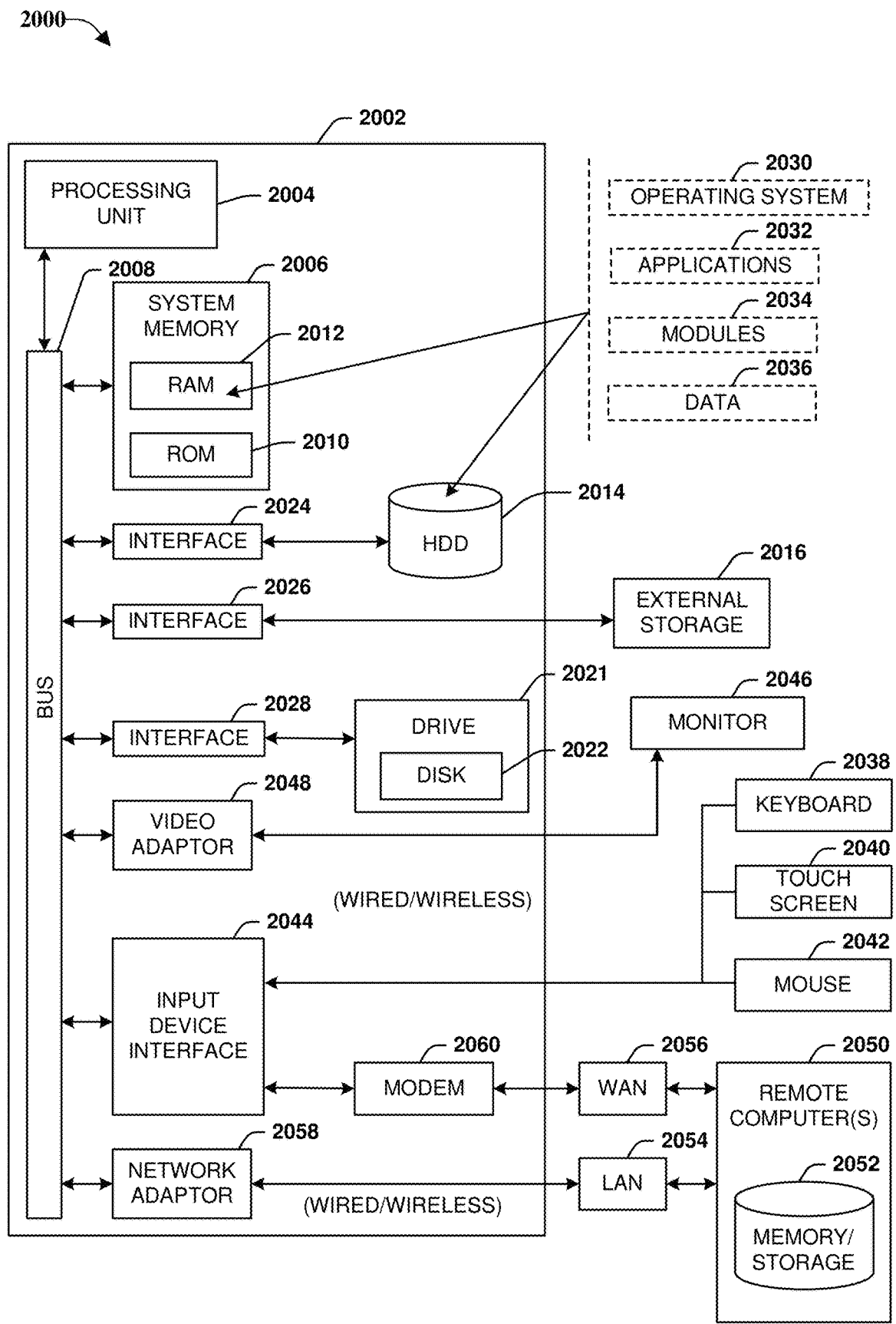
FIG. 20 depicts a suitable operating environment in which various embodiments described herein can be implemented.

FIG. 20 provides additional context for various embodiments described herein, intended to provide a brief, general description of a suitable operating environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which includes computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media includes, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example operating environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a nonvolatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and a drive 2020, e.g., such as a solid state drive, an optical disk drive, which can read or write from a disk 2022, such as a CD-ROM disc, a DVD, a BD, etc. Alternatively, where a solid state drive is involved, disk 2022 would not be included, unless separate. While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and drive 2020 can be connected to the system bus 2008 by an HDD interface 2024, an external storage interface 2026 and a drive interface 2028, respectively. The interface 2024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for applications 2032. Runtime environments are consistent execution environments that allow applications 2032 to run on any operating system that includes the runtime environment. Similarly, operating system 2030 can support containers, and applications 2032 can be in the form of containers, which are lightweight, standalone, executable packages of software that include, e.g., code, runtime, system tools, system libraries and settings for an application.

Further, computer 2002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) includes a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, etc.

A monitor 2046 or other type of display device can be also connected to the system bus 2008 via an interface, such as a video adapter 2048. In addition to the monitor 2046, a computer typically includes other peripheral output devices (not shown), such as speakers, printers, etc.

The computer 2002 can operate in a networked environment using logical connections via wired and/or wireless communications to one or more remote computers, such as a remote computer(s) 2050. The remote computer(s) 2050 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2052 is illustrated. The logical connections depicted include wired/wireless connectivity to a local area network (LAN) 2054 and/or larger networks, e.g., a wide area network (WAN) 2056. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2054 through a wired and/or wireless communication network interface or adapter 2058. The adapter 2058 can facilitate wired or wireless communication to the LAN 2054, which can also include a wireless access point (AP) disposed thereon for communicating with the adapter 2058 in a wireless mode.

When used in a WAN networking environment, the computer 2002 includes a modem 2060 or can be connected to a communications server on the WAN 2056 via other means for establishing communications over the WAN 2056, such as by way of the Internet. The modem 2060, which can be internal or external and a wired or wireless device, can be connected to the system bus 2008 via the input device interface 2044. In a networked environment, program modules depicted relative to the computer 2002 or portions thereof, can be stored in the remote memory/storage device 2052. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above, such as but not limited to a network virtual machine providing one or more aspects of storage or processing of information. Generally, a connection between the computer 2002 and a cloud storage system can be established over a LAN 2054 or WAN 2056 e.g., by the adapter 2058 or modem 2060, respectively. Upon connecting the computer 2002 to an associated cloud storage system, the external storage interface 2026 can, with the aid of the adapter 2058 and/or modem 2060, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This includes Wireless Fidelity (Wi-Fi) and BLUETOOTH wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As employed in the subject specification, the term "processor" refers to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor refers to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, a TSP as discussed above as an example of a load device, a graphics processing unit (GPU), or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or includes both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A regulator circuit for providing power to a load device having a first deterministic power demand over time, comprising:
    a power supply;
    a regulator configured to receive power on a first power rail from the power supply; and
    a deterministic energy provisioning device coupled to the regulator and the load device on a second power rail, wherein the regulator circuit is configured to:
    store energy provided by the power supply for a defined period of time based on a power demand schedule to the deterministic energy provisioning device, wherein the deterministic energy provisioning device is configured to augment deliverable peak power to the load device when the power demand schedule indicates more power is to be required by the load device than is provisioned by the power supply.

2. The regulator circuit of claim 1, wherein the deterministic energy provisioning device further comprising a storage device to store excess energy during periods when excess power is provisioned by the power supply, and subsequently provide stored energy from the storage device to the load device to satisfy a demand load in excess of provisioned energy in accordance with an energy profile.

3. The regulator circuit of claim 2, wherein the storage device for storing excess energy comprises a high-voltage energy pooling capacitor.

4. The regulator circuit of claim 3, wherein the high-voltage energy pooling capacitor comprises more than one high voltage capacitor.

5. The regulator circuit of claim 2, wherein the deterministic energy provisioning device further comprising provisioning energy based on information known about successive demand loads.

6. A regulator circuit for providing power to a load device having a power demand profile over time, comprising:
    a power source having a first power rail for providing power;
    a regulator coupled to the first power rail; and
    a deterministic energy provisioning (DEP) device coupled to the regulator and the load device by a second power rail, wherein the regulator circuit is configured to:
    manage an input power to the load device whereby an input current on the first power rail is maintained at or below a selected power rail current level, and wherein current on the second power rail is provided to the load device by the power source and the DEP device for a first period of time,
    wherein the DEP device further comprises a storage device to store excess energy during a second period of time when excess power is provisioned by the power source, the excess energy subsequently supplied to the load device during the first period of time, and
    wherein the DEP device further comprises provisioning extra energy based on the power demand profile that provides information about successive demand loads.

7. A system having a regulator circuit for providing power to a deterministic load, comprising:
    a first power source having a power rail;
    a regulator for managing delivery of power from the power rail to a load device in accordance with a power demand schedule; and
    a deterministic energy provisioning device coupled to the regulator and the load device, wherein the regulator circuit is configured to:
    manage an input power to the load device over a first period of time, and
    schedule an execution of a series of operating states of the load device using an energy requirement based on the power demand schedule, the energy requirement to be provided by the first power source and the deterministic energy provisioning device during a second period of time.

8. The system of claim 7, wherein the deterministic energy provisioning device further comprising a high voltage pooling capacitor to store excess energy during the second period of time when excess power is provisioned by the first power source, the excess energy subsequently supplied to the load device during the first period of time.

9. The system of claim 8, further comprising a second power source having a second power rail, wherein the regulator manages delivery of power from the second power rail to the load device in accordance with the power demand schedule for delivering power to the load device.

10. The system of claim 8, wherein the deterministic energy provisioning device provisions extra energy in time for an excess demand load using information available in advance of the operation of the load device.

11. The system of claim 7, wherein the deterministic energy provisioning device further comprising provisioning extra energy based on information known about successive demand loads.

12. A deterministic energy provisioning (DEP) device comprising a storage device to store excess energy during periods when excess power is provisioned by a power supply, and subsequently provide the stored energy from the storage device to a load to satisfy a demand in excess of provisioned energy using information available in advance of the excess demand load; a simulation component, responsive to a power schedule and an initial state of the storage device, to simulate operation of a series of operating states described by the power schedule.

13. The DEP device of claim 12, wherein the simulation component determines whether power provided for the load from the power supply, combined with energy stored on the storage device, is sufficient to handle demand loads for an operating state of the load that exceeds the power provisioned for the operating state.

14. The DEP device of claim 13, further comprising a regulator for managing delivery of power from the power supply to the load in accordance with the power schedule.

15. The DEP device of claim 14, wherein the regulator is a buck/boost regulator.

* * * * *